United States Patent [19]
Room et al.

[11] Patent Number: 6,044,530
[45] Date of Patent: Apr. 4, 2000

[54] SLOTTED CLIP AND METHOD

[75] Inventors: David Room, Skokie; Matthew Graszer, Palatine; Paul Lackler, Elmhurst, all of Ill.

[73] Assignee: Stanley Fastening Systems, L.P., New Britian, Conn.

[21] Appl. No.: 09/039,079

[22] Filed: Mar. 10, 1998

Related U.S. Application Data

[63] Continuation-in-part of application No. 08/942,533, Oct. 2, 1997, abandoned.

[51] Int. Cl.[7] .............................. B65D 71/00; H01B 17/00
[52] U.S. Cl. ................................. 24/336; 24/339; 24/340; 206/345
[58] Field of Search ............................. 24/336, 335, 339, 24/346, 340, 20 W, 23 W

[56] References Cited

U.S. PATENT DOCUMENTS

| | | | |
|---|---|---|---|
| 2,385,209 | 8/1945 | Joyce ......................................... | 24/339 |
| 2,574,811 | 11/1951 | Blumensaadt . | |
| 3,613,878 | 10/1971 | Langas . | |
| 3,722,670 | 3/1973 | Plunkett . | |
| 3,778,537 | 12/1973 | Miller ....................................... | 24/339 |
| 4,508,220 | 4/1985 | Pearson . | |
| 4,648,158 | 3/1987 | West . | |
| 5,303,821 | 4/1994 | Ayres ..................................... | 206/345 |
| 5,314,064 | 5/1994 | Wells et al. .............................. | 206/340 |
| 5,314,065 | 5/1994 | Ayres et al. . | |
| 5,463,189 | 10/1995 | Deneke et al. ........................... | 24/336 |
| 5,564,564 | 10/1996 | Poffenberger ........................... | 206/340 |
| 5,682,994 | 11/1997 | Poffenberger . | |

FOREIGN PATENT DOCUMENTS 2023216  12/1979  United Kingdom .

*Primary Examiner*—Victor N. Sakran
*Attorney, Agent, or Firm*—Fitch, Even, Tabin & Flannery

[57] ABSTRACT

A clip and collected assembly thereof are provided and including a method of forming the clip and clip assembly. The clip is formed with at least one slot that has at least one projection for keeping a resilient cord press fit in the slot therein against forces tending to shift it out therefrom. Preferably, two parallel slots are provided for receiving two cords therein with there being two opposing projections extending into the slot opening from either side of the slot. The slot projections provide an attendant manufacturing benefit as the punches of the die press apparatus that punch slugs from the blank fed thereto will not suffer from slug pulling problems because of the presence of corresponding projections extending into the die cavity openings from either side thereof. In addition, while the clearances between the projection of the die cavity and the punches are at normal tight tolerances, the clearance between the cavity sides and ends and the punches are oversized so that burrs are formed on the corresponding clip slot sides and ends for gripping the cord and providing additional resistance to shifting in the slot. Improved configurations for the cords are also provided to meet the tolerances required for the press fit in the slots and to be readily severed by an application tool. Special shapes for the slot ends can be provided so that as the cords are press fit therein, areas of weakness will be created in the cords to assist in the severing thereof. Preferred cord materials include those that will not bead when run through spring tempering heat treat ovens, such as nylon and PBT.

6 Claims, 14 Drawing Sheets

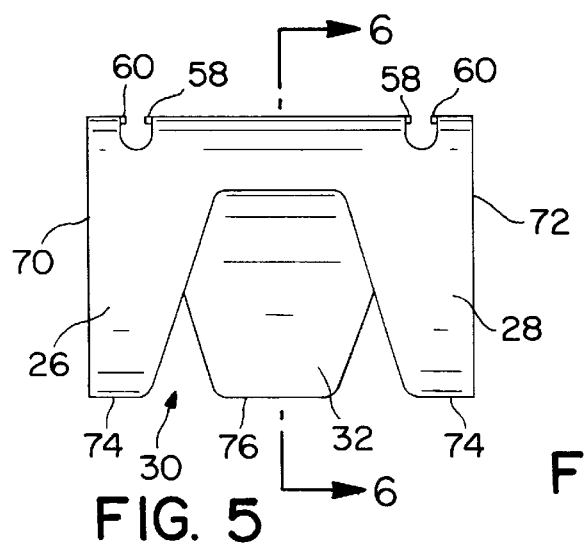
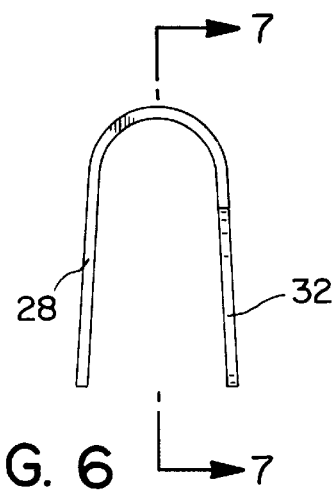
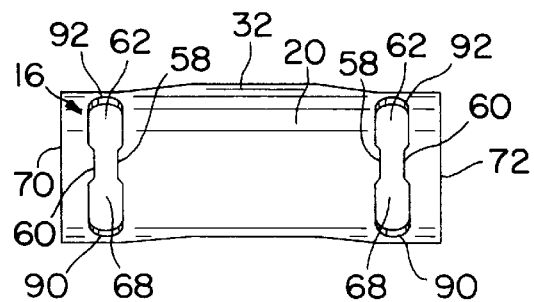
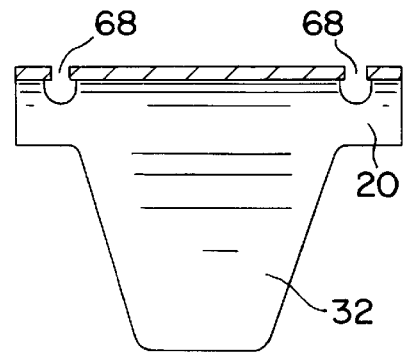
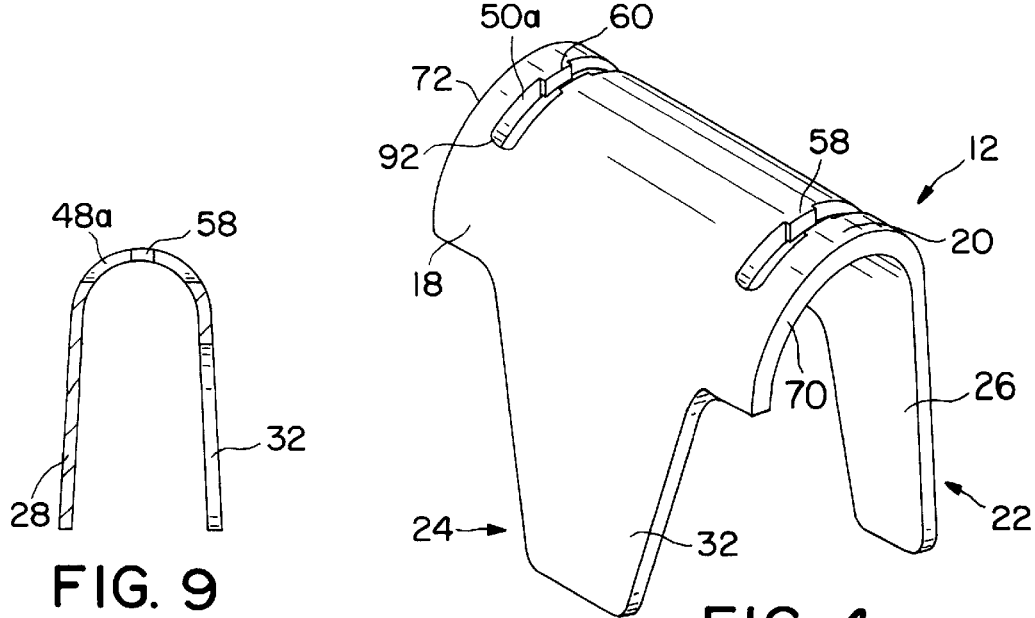

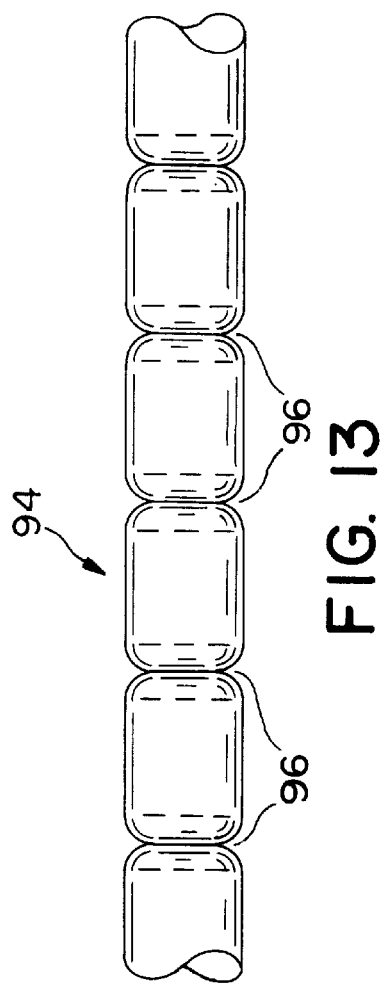
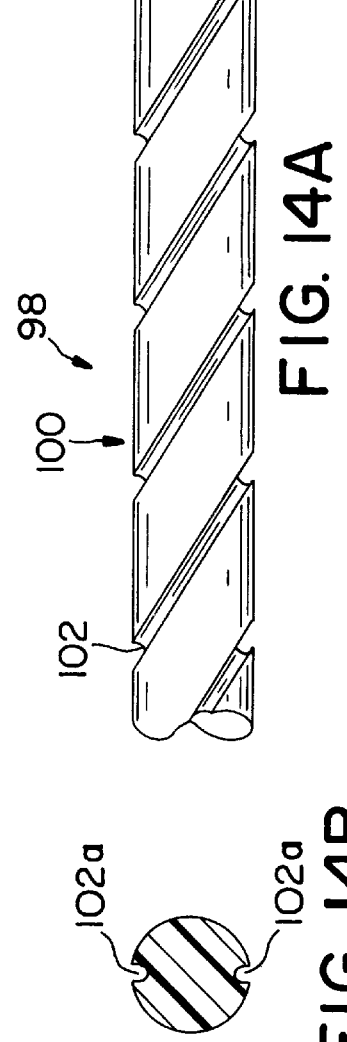
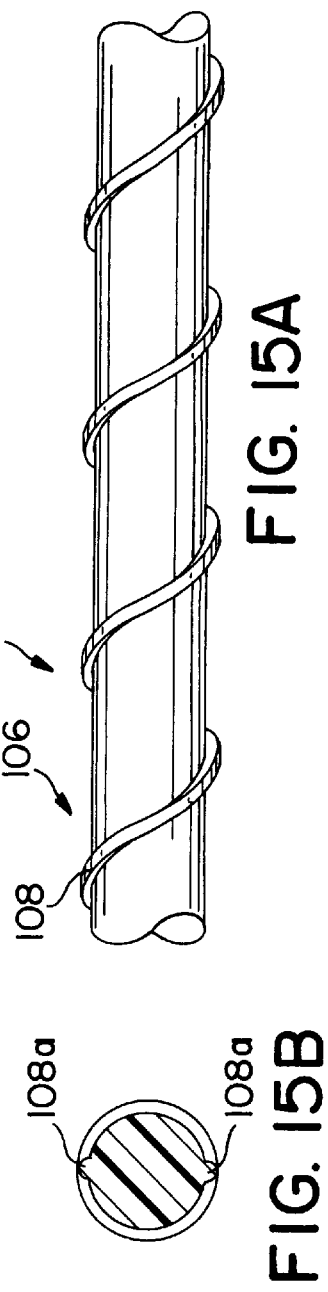
FIG. 13
FIG. 14A
FIG. 14B
FIG. 15A
FIG. 15B

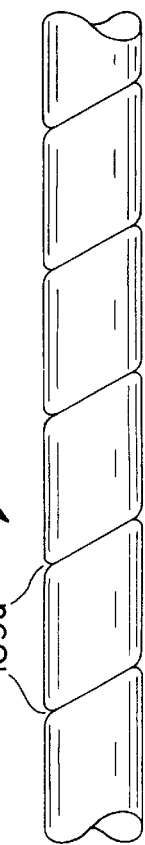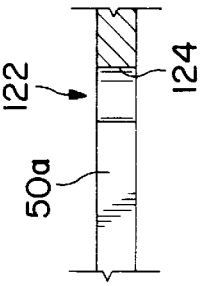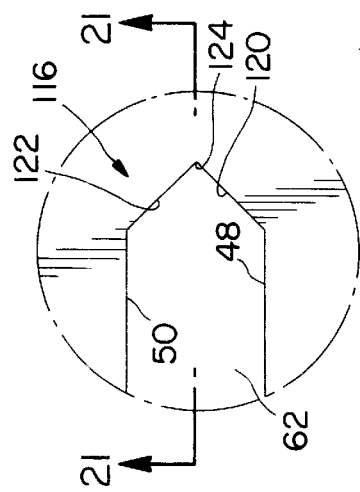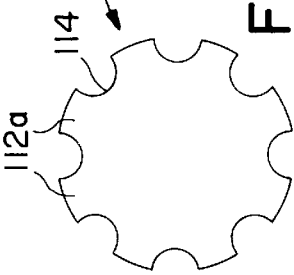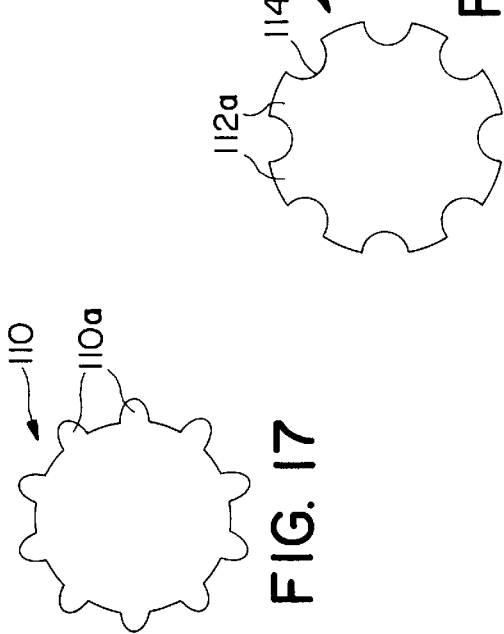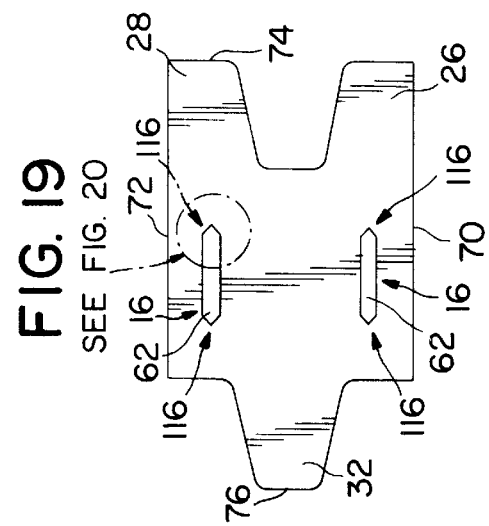

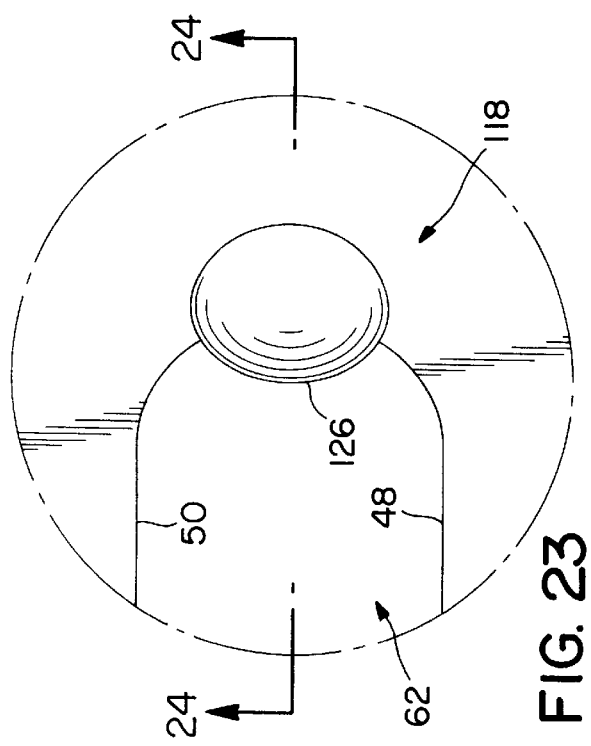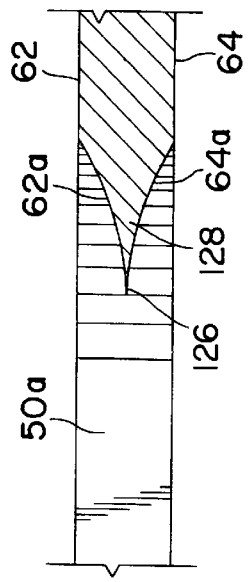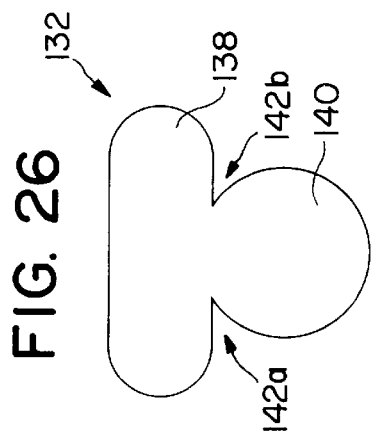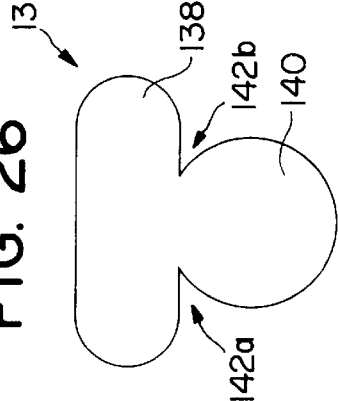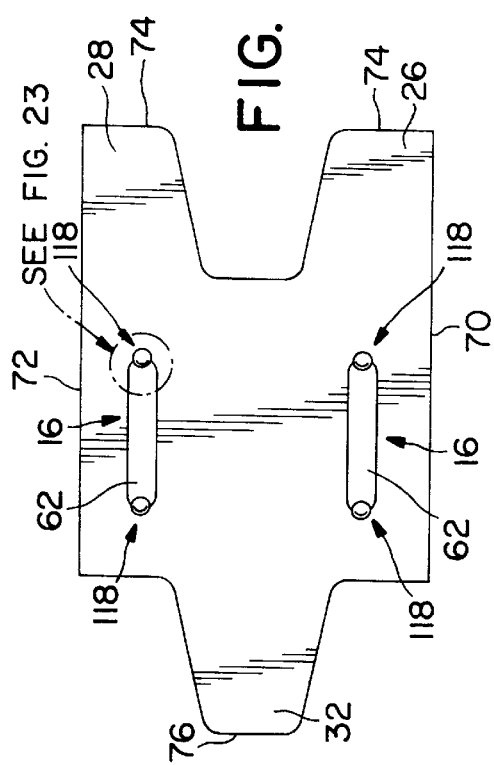

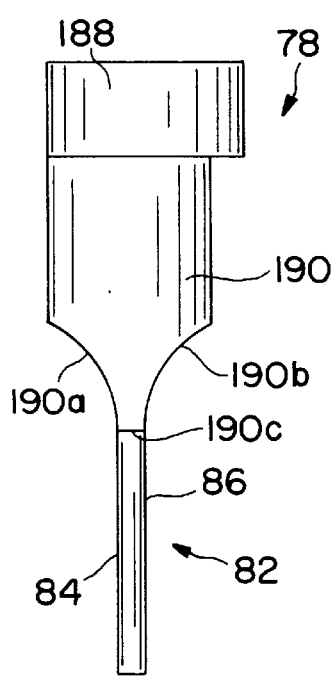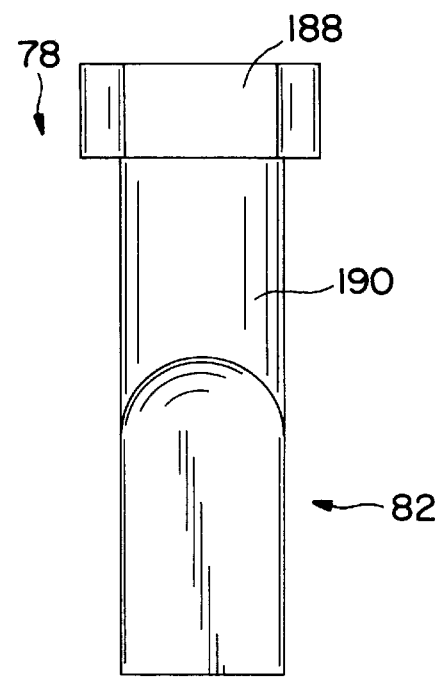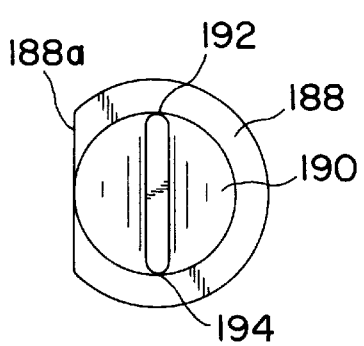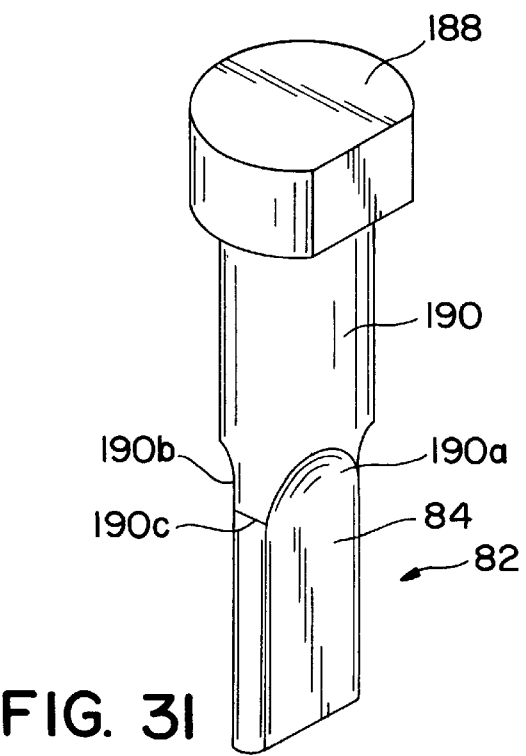

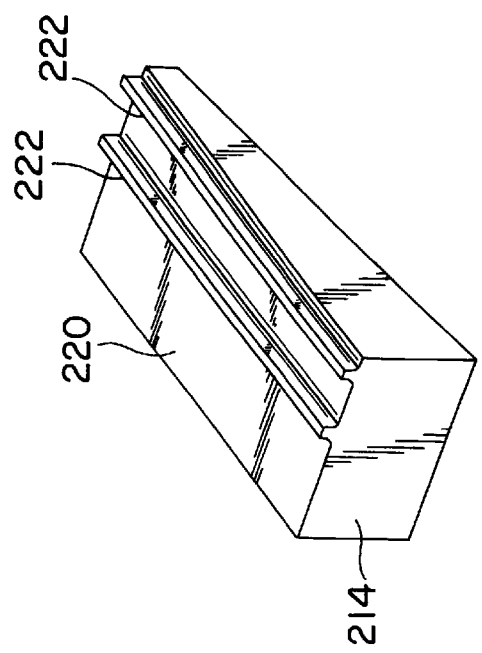
FIG. 38
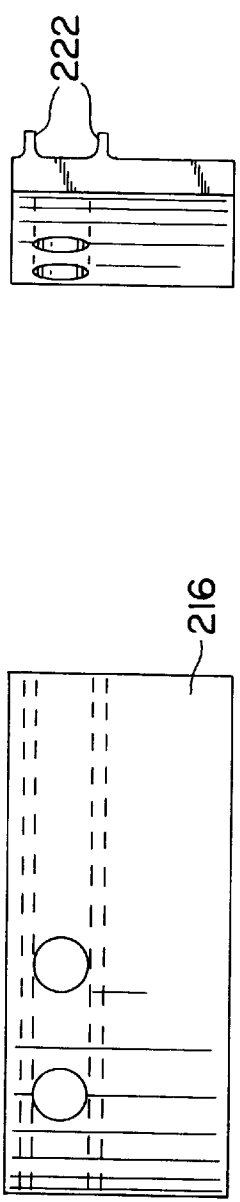
FIG. 40
FIG. 41
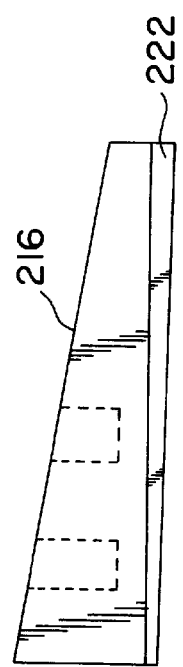
FIG. 39

6,044,530

SLOTTED CLIP AND METHOD

This is a continuation-in-part, of application No. 08/942,533, filed Oct. 2, 1997, now abandoned.

FIELD OF THE INVENTION

The invention relates to a slotted clip and method of forming the same and, more particularly, to an assembly of attached clips having a resilient cord inserted in slots thereof.

BACKGROUND OF THE INVENTION

In the mattress and bedding industry, it has long been known to use clips for attaching border wires to coil springs. These clips have a fairly standard generally U-shaped construction and are formed from a blank of metal material so that the clips have a crown portion and leg portions that depend from either end of the crown portion. One of the leg portions has a generally bifurcated construction to provide a pair of leg projections that are spaced from each other, and the other leg portion is formed into a single projection that is aligned with the space between the bifurcated leg projections so that the projections do not interfere with each other as they are clinched about adjacent wires to be attached.

For storage, transportation and application purposes, several different ways to collate the clips into an assembly of attached clips have been utilized. Generally, some sort of flexible connecting member is utilized so that the clips are identically oriented in end-to-end fashion in a row for being loaded in either a hand-held application tool or a vertical rotating clipping (VRC) machine which cut individual clips from the assembly and clinches them about wires to be held together.

Both the hand-held application tool and the VRC machine have a piston driven plunger which has a knife edge that cuts the particular connecting member utilized to hold the clips in assembled form. Various types of connectors have been employed for keeping the clips together in a flexible manner so that the clips can be compactly wound into a coil for storage and shipping purposes, and so that they can be unwound and fed into the application tool. Flexible wire connecting elements are commonly used to interconnect U-shaped clips. Parallel wires are attached to the clips by welding to the tops of the clip crowns and are severed by the aforementioned knife edge on the tool plunger. One shortcoming of the flexible wire connectors is that they cause a dulling of the application plunger tool knife edge which requires that the plunger blade be regularly sharpened or replaced so that the tool can consistently separate the clips from the collated assembly for clinching individual clips about the wires.

It is also known to hold clips together in assembly by plastic cords held in slots formed in the crown portion of the clips, see e.g., published application GB 2,023,216 A; U.S. Pat. No. 5,303,821; and U.S. Pat. No. 5,564,564. Plastic cords have the advantage over their metal wire counterparts of not having as much of a dulling effect on the knife edge of the application tool plunger, and not requiring that the blade edge be as sharp in order to sever the plastic cord. Because the plastic cords use slots formed in the clips as opposed to being welded directly to the clip material, the challenge with plastic cords is how best to form the slots and properly hold the cords therein. In this regard, manufacturing and material costs are important considerations, given the additional step required to form the necessary slots in the clips and the generally higher raw material costs for the plastic material versus metal wire.

While it is known to use a friction or press fit of plastic cords into the clip slots, this type of connection in and of itself normally is less than desirable for withstanding the various tensile forces and bending and twisting forces to which the attached cord will be subjected, such as occasioned by the coiling and uncoiling of the collating clip assembly, without separation of the clips from the cord. Also, because of cost considerations, it is desirable to use the smallest diameter cord possible so that the cord can be properly and easily severed by the application tool, while still maintaining the tolerances required for a consistent friction fit in the slot from clip to clip in the collated assembly. Another concern where very small diameter cords are used to be friction fit in clip slots is that the slots have to be also of a very small size which can cause problems when they are being formed. To form these small slots in a stamping or punching process, a relatively small sized punch is needed. Small punches that are not very robust may reduce punch life to a level that is not acceptable for high volume production of collated clip assemblies. Accordingly, the size of the plastic cord and thus of the slot in which it is friction fit is a compromise between a cord diameter that meets the desired cost criteria and allows for proper severing in the application tool, and an acceptable punch life for high volume clip assembly.

As previously discussed, there have been a number of prior clips which utilize special slot constructions to hold the plastic cord therein. It would be desirable to form the clip slots such that they hold the cord in the slots without requiring significant modifications to the manufacturing process. In most prior clips, their manufacture requires that additional clip material be bent or deformed for holding the cords in the slots of the clips, which generally calls for an additional manufacturing step, undesirably raising production costs. Accordingly, there is a need for a better formed clip slot for securely receiving plastic cords therein.

The small diameter plastic cords also tend to present a problem in keeping the cord at a circular cross-sectional shape within desired tolerances for being properly press fit in slots of the clips. With many plastic materials that meet the necessary cost criteria, there is a trade-off between achieving the desired cross-sectional shape and having the right tolerances for press fitting the cord into the slot.

Another factor in the design of the cord is the melt characteristics of the plastic material that is utilized. This can be important where the assembled mattress springs having the clips clinched thereon are tempered in a heat treat oven. If the heating is sufficient to melt the plastic of the cords in the clip slots, a problem arises if the plastic material beads together so as to create a bump over the top of the clips. Any small bumps like these are to be avoided, as they could create problems when the mattress material is applied over the assembled springs.

SUMMARY OF THE INVENTION

In accordance with the present invention, a slotted clip and a collated assembly of such clips that are connected by at least one plastic cord are provided with the cord or cords being securely and captively held in aligned slots of the clips. The cords are press fit into the slots and are held therein without requiring a separate manufacturing step or deformation of clip material to obtain a secure connection of the cord in the slots similar to many prior collated clip assemblies. More particularly, projections are provided in the slot so that when the cord is inserted and seated in the slots, the projections resist cord pullout therefrom. Further, in a preferred form, the slot having the projections is provided with burrs that are intentionally formed on the side walls of the slot for gripping the cord to resist shifting of the cord in the slots.

Thus, for example, when the blade edge of an application tool plunger becomes dull, operation thereof, rather than cleanly shearing through the cord, can tend to pull on the cord before it breaks off causing it to rise up in the slot. The projections in the slots of the present clips tend to keep the cord properly seated in the slot, and the burrs on the slot side walls resist the pulling action on the cord created by the dull application tool blade.

In a preferred form of the invention, a clip is provided having a body formed of metallic material and having an arcuate crown portion and depending leg portions with the clip having a width across the crown and a length transverse to the width. At least one slot is provided that extends lengthwise in the clip body and through the crown portion thereof to define a slot opening for receiving a resilient cord therein. Side surfaces of the slot extend vertically through the clip body and have a predetermined spacing in the widthwise direction therebetween. The predetermined spacing is selected to create an interference friction fit with a resilient cord that is press fit in the slot. At least one projection is provided at a predetermined position along the length of one of the slot side surfaces and which extends into the slot opening for maintaining a resilient cord press fit into the slot against shifting out from the slot.

In a preferred form, the slot side surfaces include burrs for gripping a resilient cord to resist shifting of a cord in the slot in the lengthwise direction.

A pair of identical parallel slots may be provided in the clip for correspondingly receiving a pair of resilient cords press fit therein.

Preferably, a pair of opposing projections are provided that extend into the slot opening from predetermined positions along both slot side surfaces toward each other. The slot includes opposite ends interconnecting the slot side surfaces, and the predetermined positions of the projections can generally be midway between the slot ends along the respective side surfaces.

To assist in severing of the cord by the application tool, the slot can be formed with either V-shaped ends or a thin edge provided thereat so that when the cord is seated at the ends of the slot, an area of weakness is created in the cord.

In another form of the invention, a collated assembly of attached clips each having a body of a metal material and including a crown and depending leg portions is provided. The clip assembly includes slots in the clip bodies having slot walls defining slot openings with adjacent clip bodies having slot openings that are arranged to be in alignment with one another in the clip assembly. A cord of resilient plastic material is inserted in the aligned slot openings of adjacent clips for holding the adjacent clip bodies together. Burrs are formed on the slot walls to grip the plastic cord to keep the cord substantially fixed in the slot openings of adjacent clip bodies in the clip assembly to hold the clips attached together in the collated assembly.

The slots can include substantially vertical side surfaces extending parallel to each other and spaced at a predetermined distance across the slot openings from each other. The plastic cord can have a generally circular cross-sectional configuration with a diameter sized to provide an interference friction fit between the parallel side walls.

The cord can be provided with areas of reduced diameter spaced therealong so that they are disposed between adjacent attached clips or, as discussed, these can be formed when the cord is inserted in the slots by the specially formed ends thereof for ease in severing of the cord to separate clips from the assembly.

The cord may be provided with an outer contoured surface that has a maximum diameter larger than the spacing between the slot side surfaces for providing a press fit despite minor variations in the diameter along the length of the cord. The contoured surface can be provided on one of a fluted cord, a splined cord, a twisted cord, and a helical cord. The helical cord can have one of a helical projection and a helical depression on its outer surface. In this manner, the cords of the invention do not require the tight tolerances of a cord having a circular cross-sectional shape for being press fit in the slots while still providing or proper severing characteristics.

Another alternative construction for the cord can be to provide it with a tubular configuration having an outer diameter sized to provide a press fit in the slot opening between the side surfaces thereof. The tubular cord reduces the amount of plastic material and thus the cost of the cord. In addition, the application tool blade does not have to go through as much plastic material, enhancing the severability thereof. Similar to the above-described cords having a contoured outer surface, the tubular cord can be provided with a larger outer diameter over cords with circular cross-sectional configurations without significantly hampering the cord insertion process.

Preferably, the cord plastic material is a polymer that is generally flowable at temperatures over approximately 450° F. In this manner, when mattress springs having the clips applied thereon are tempered in a heat-treat oven, the severed cord section in the slot of an individual clip will melt and flow such as to the interfaces between the attached wires and coils rather than beading up. It has been found that one plastic material that meets these criteria is polybutylene terephthalate (PBT).

Another aspect of the invention is the provision of a die apparatus for forming slots in a blank strip of material. The die apparatus includes upper and lower portions that are moved toward and away from each other in a slot forming cycle. A punch is carried by the upper portion and includes a slot forming portion. A die opening is formed in the lower portion and has spaced sides sized to receive the slot forming portion of the punch therein for punching and separating portions of the material disposed over the die opening when the die portions are moved toward each other to form a slot in the strips substantially having the shape of the die opening. Projections extend into the die opening toward each other from the sides of the die opening to limit the pulling of punched and separated portions of the strip material back up with the punch as the die portions move away from each other. Accordingly, the projections of the die herein serve dual purposes of forming projections in the slots which assist in holding the attaching plastic cord therein as previously discussed, and enhance manufacture of the slots by limiting or preventing punched out slugs from being pulled back through the die opening with the punch as it is retracted therefrom.

The spaced sides of the die opening can extend substantially parallel to each other, and the projections can include a surface spaced from the respective die sides and extending substantially parallel thereto such that a first clearance is provided between the slot forming portion of the punch and the projection surfaces and a second larger clearance is provided between the slot forming portion of the punch and the sides of the die opening. Preferably, the first clearance between the punch slot forming portion and the projection surfaces is oversized for forming burrs on corresponding slot sides.

In another aspect of the invention, a method of forming a collated assembly of clips attached by a resilient cord is provided. The method includes feeding a section of a blank metal strip over a die opening in a slot forming die for punching slot openings in the strip, providing projections extending into the die opening from opposite sides thereof, driving a punch against the strip section and into the die opening to punch a slot opening in the strip section so that the slot has sides and projections substantially corresponding to the die sides and projections, retracting the punch from the die opening, restricting slugs of the strip punched therefrom from being pulled out from the die opening by the die projections as the punch is retracted, advancing the slotted strip section to a strip cutting and clip forming station with a succeeding section of the strip being brought into position over the die openings, cutting and forming a clip from the slotted strip section with the clip having crown and depending leg portions as the succeeding section of the strip has a slot opening punched therein, and inserting a resilient cord into slots of cut and formed slotted clips to attach the clips together in a collated assembly.

BRIEF DESCRIPTION OF THE DRAWINGS

FIG. 4 is a perspective view of a slotted generally U-shaped clip in accordance with the present invention showing a pair of parallel slots formed in a crown portion of the clip;

FIG. 5 is an end elevational view of the clip of FIG. 4 showing projections extending into the slot from either side thereof;

FIG. 6 is a side elevational view taken along line 6—6 of FIG. 5;

FIG. 7 is a view taken along line 7—7 of FIG. 6 and extending through the slot showing the clip crown portion in section including the opposing projections extending into the slots;

FIG. 8 is a plan view of the clip showing the clip crown portion and slots formed therein;

FIG. 9 is a side sectional view of the clip taken through one of the clip slots and showing one of the projections thereof;

FIG. 13 is an elevational view of an alternative cord having areas of reduced diameter spaced along its length;

FIGS. 14a and 14b are elevational and cross-sectional views, respectively, of a cord having a helical depression formed around its outer surface along the length of the cord;

FIGS. 15a and 15b are elevational and cross-sectional views, respectively, of a cord having a helical projection extending around its outer surface along the length of the cord;

FIG. 16 is an elevational view of a twisted cord;

FIG. 17 is a depiction of the shape of an outer contoured surface of a cord having a splined configuration;

FIG. 18 is a depiction of the shape of an outer contoured surface of a cord having a fluted configuration;

FIG. 19 is a plan view of a cut section of the blank strip with slots formed therein having V-shaped ends for creating an area of weakness in the cord when press fit therein;

FIG. 20 is an enlarged view of one of the V-shaped ends of the slot;

FIG. 21 is a sectional view taken along line 21—21 of FIG. 20;

FIG. 22 is a plan view of a section of the blank strip having slots formed therein with ends of the slot including a thin edge for creating an area of weakness in a cord press fit in the slot;

FIG. 23 is an enlarged view of one of the ends of the slot showing the thinned edge thereof;

FIG. 24 is a sectional view taken along line 24—24 of FIG. 23;

FIGS. 25 and 26 are views of alternative constructions for the plastic cord showing the cross-sectional configuration thereof with an upper portion and a lower foot portion for being press fit into the clip slots;

FIGS. 31–34 are various views of a punch carried by the upper portion of the die press;

FIGS. 38–41 are various views of a cord insertion block including parallel tapered ridges which push the cord into the slots and progressively seat it therein;

DETAILED DESCRIPTION OF THE PREFERRED EMBODIMENTS

Figure 1:
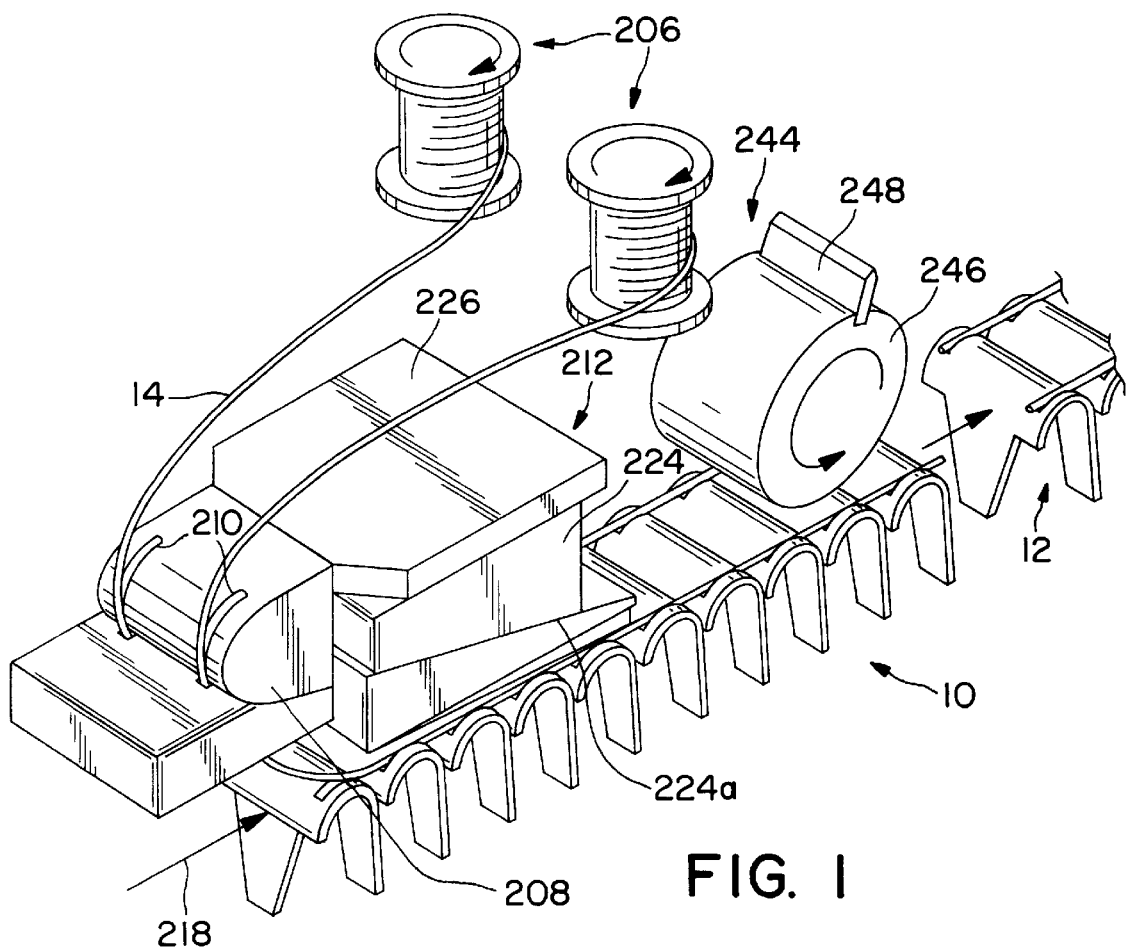
FIG. 1 is a perspective view showing a cord insertion station of a process for forming a collated assembly of slotted clips attached by plastic cords in accordance with the present invention.
Figure 2:
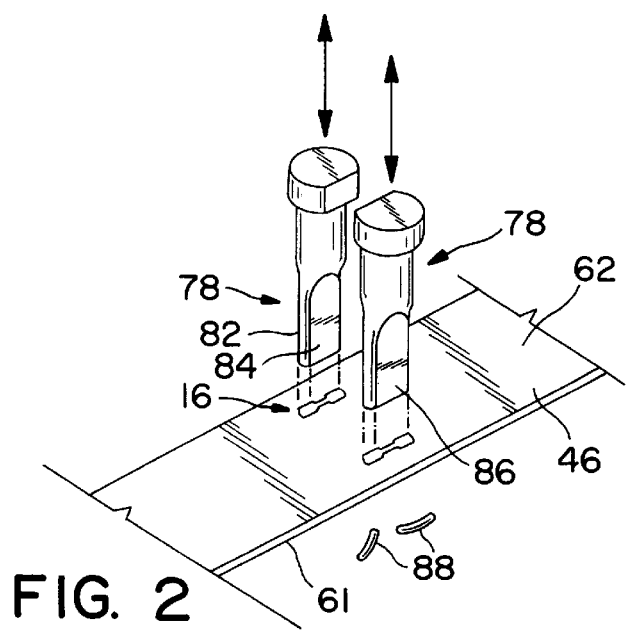
FIG. 2 is a perspective view of a section of a blank metal strip of material having slots punched therein at a slot punch station of the present process.
Figure 3:
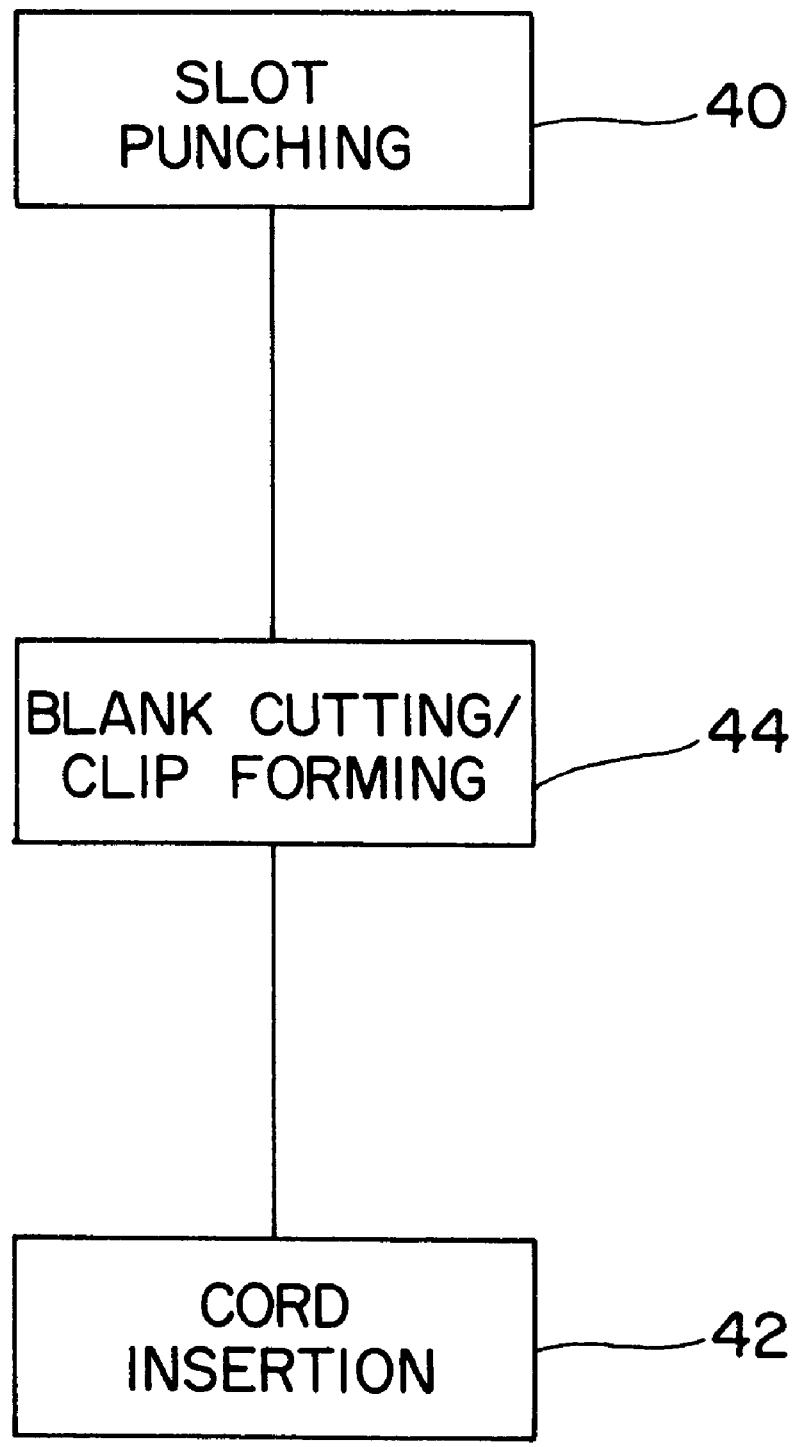
FIG. 3 is a schematic view of the process of forming the collated assembly of slotted clips attached by plastic cords in accordance with the present invention.
Figure 10:
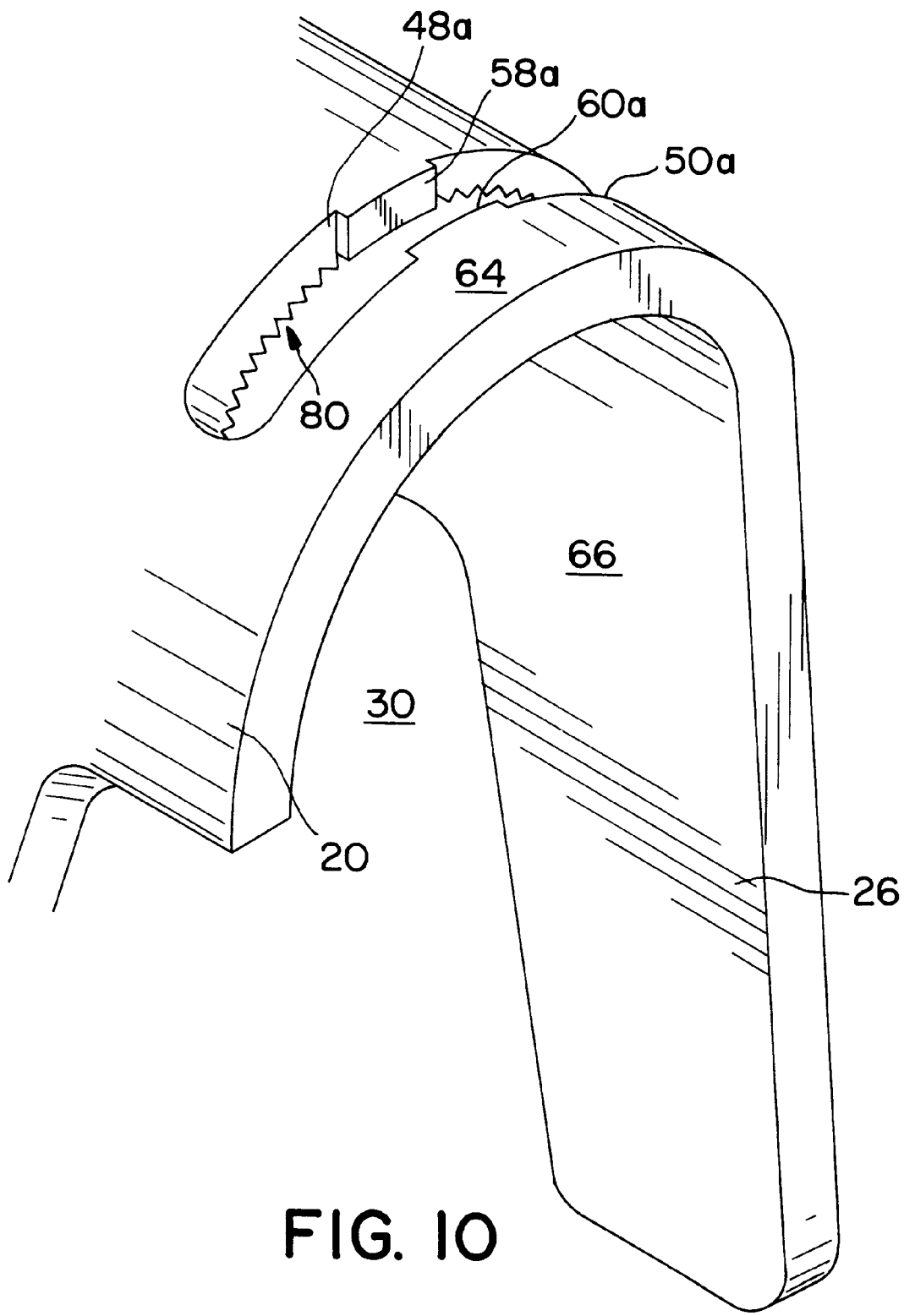
FIG. 10 is an enlarged fragmentary perspective view of the clip of FIG. 4 showing one of the slots and the projections thereof and including in magnified form burrs formed at the bottom of the slot.
Figure 11:
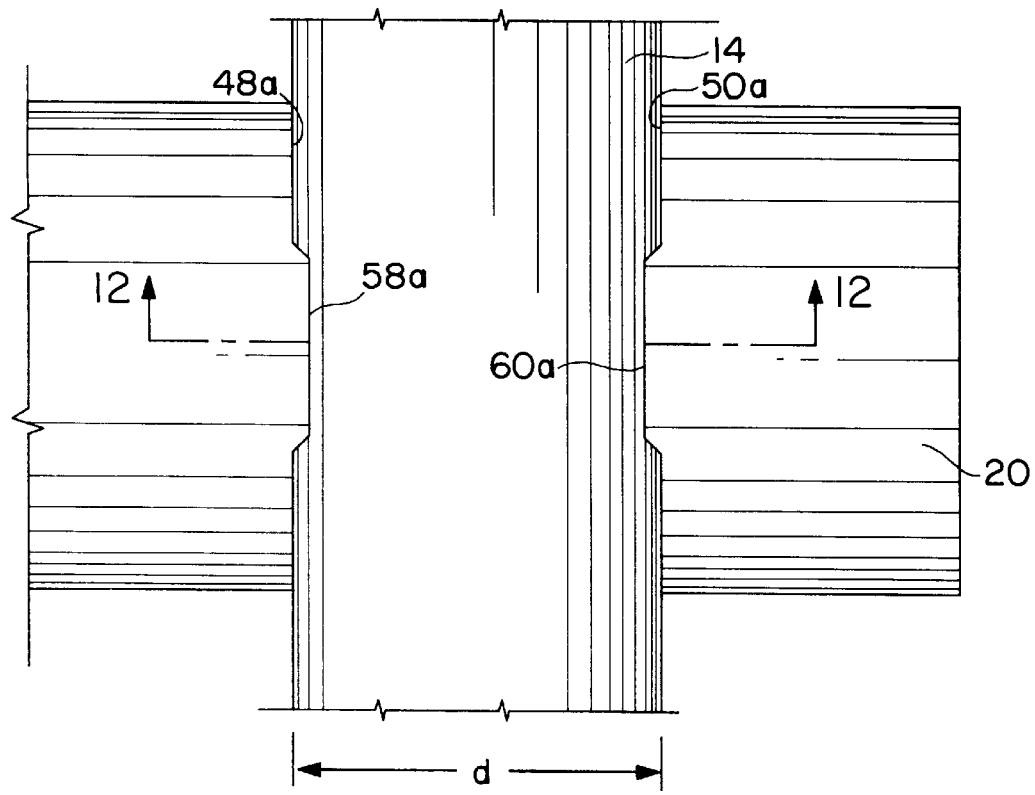
FIG. 11 is a plan view of a plastic cord press fit in one of the clip slots.

FIGS. 1–3 show a process or method for forming a collated assembly 10 of individual slotted clips 12 that are attached by at least one resilient cord 14 of plastic material that is inserted in at least one corresponding slot 16 formed in clips 12 arranged in end-to-end orientation with their respective slots 16 aligned. In the preferred form, two parallel slots 16 are formed in each clip 12 for receiving a pair of cords 14, as shown. Referring to FIGS. 4–6, the clips 12 are of identical construction in that each has a body 18 of metallic material having a generally U-shaped construction including an arcuate crown portion 20 with leg portions 22 and 24 depending from either end thereof. As is known, one of the leg portions 22 can be provided with a bifurcated construction with a pair of leg projections 26 and 28 that are spaced from each other on either side of the clip 12 so as to provide an intermediate space 30 therebetween. At the other end of the clip crown portion 20, the depending leg portion 24 therefrom includes a single intermediate leg projection 32 that is aligned with intermediate space 30 between the leg projections 26 and 28 at the other end of the clip crown portion 20. Thus, when the clip 12 is clinched by application tool 34 about wires 36 and 38 to be connected (FIG. 43), the leg projections 26 and 28 and leg projection 32 will be moved toward each other about the wires 36 and 38, with the intermediate projections 32 having clearance to move past the projections 26 and 28 through the space 30 formed therebetween.

As depicted in FIG. 3, the present slotted clips 12 and, in particular, the collated assembly 10 thereof, can be formed in a relatively straightforward three-stage process by providing a slot punching station 40 before and a cord insertion station 42 after a conventional blank cutting and clip forming station 44 which cuts a blank strip 46 of slotted metal material as it comes from the slot punching station 40 and shapes it into the above-described form of the clip body 18. Unlike prior collated slotted clip assemblies, there is no separate or additional step that is required to obtain a secure connection of the cord 14 in the slots 16 of the present clips 12, as will be described more fully herein.

Figure 12:
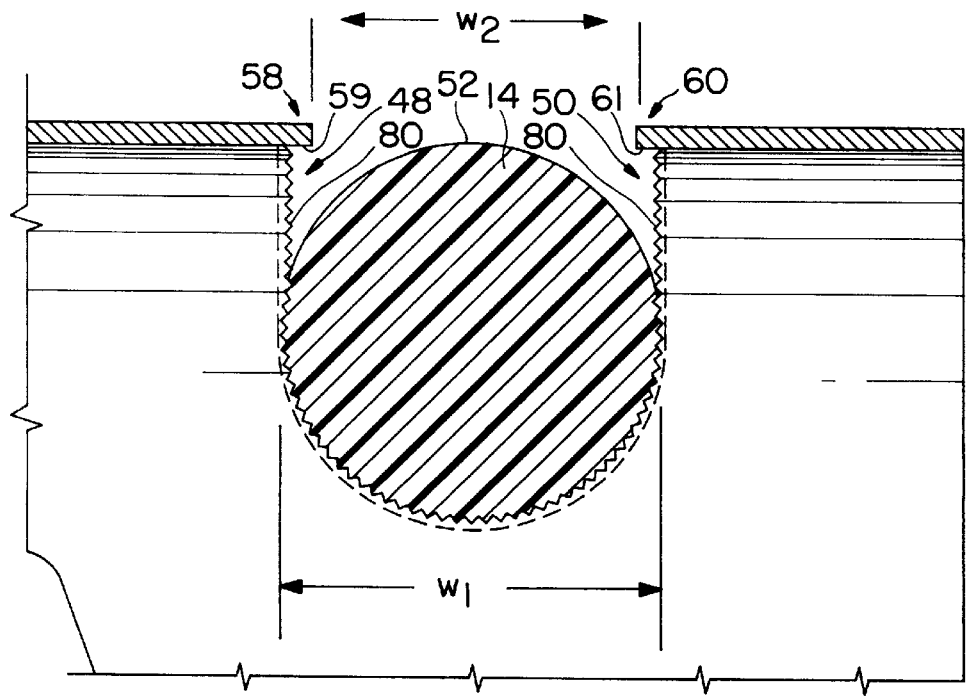
FIG. 12 is a sectional view taken along line 12—12 of FIG. 11 showing the cord compressed in the slot and the burrs of the slot gripping the cord plastic material.

To hold the plastic cords in slot 16 of the clips 12, an interference friction fit is provided with the cords 14 being press fit into slots 16 at the cord insertion station 42. More particularly, the size of the slot 16 is coordinated with the size of the cords 14 so that when the cord 14 is inserted into the slot 16, it will be compressed against opposite sides or side walls 48 and 50 of the slots 16, as best seen in FIG. 12. As the cord 14 is of a resilient plastic material, it will be deformed in the slot 16 with there being a frictional engagement between cord outer surface 52 and surfaces 48a and 50a of the slot sides 48 and 50. When the cord 14 is press fit into aligned slots 16 and frictionally held therein due to the interference fit, a flexible collated assembly 10 of attached clips 12 is provided that is similar in flexibility to that of clips attached by metal wires for ease in coiling and uncoiling thereof. As is apparent and as previously discussed, when subjecting the collated assembly 10 of clips 12 to the various tensile forces and bending and twisting forces such as can occur during coiling and uncoiling, a problem arises if these forces are sufficient to overcome the frictional resistance between the cord surface 52 and the slot surfaces 48a and 50a so that the cords 14 are pulled out from the slots 16, separating clips 12 from the collated assembly 10. This can also be a problem when the knife edge 54 of the application tool plunger 56 is dull and begins to exert a pulling action on the cords 14 to break them apart from the remainder of the cords 14, instead of applying the desired clean severing action against the cord 14 between adjacent clips 12 in the assembly 10. When this occurs, the operation of the plunger 56 of the tool 34 can drag the cord 14 through the slots 16, overcoming the frictional resistance between the slot surfaces 48a and 50a and cord surface 52a, and can also cause the cord 14 to raise up in the slots 16 to move up and out therefrom as the plunger 56 pushes downwardly on the cord 14 before it breaks without a clean severing action between cord section 14a in the leading clip 12a of the clip assembly 10 loaded in the tool 34 and the remainder of the cord 14.

In accordance with the present invention, at least one projection, and preferably a pair of projections 58 and 60 are formed at the slot punching station 40 and extend from respective sides 48 and 50 into slot opening 62 defined therebetween, as can be seen in FIGS. 5 and 7–12. The projections 58 and 60 are described in applicants' copending parent application Ser. No. 08/942,533 which is incorporated as if reproduced in its entirety herein. More particularly, the side wall surfaces 48a and 50a are formed so that they extend substantially vertically all the way through the clip body 18 so that when the slots 16 are punched, they extend from upper surface 64 through to lower surface 66 of the blank strip of metal 46. The strip 46 is formed into its U-shaped configuration at station 44 such that the strip upper surface 64 is oriented as the clip body outer surface and the strip lower surface 66 is oriented as the clip body inner surface. Thus, the slot walls 48 and 50 extend through the clip body 18 from the outer surface 64 to the inner surface 66 thereof such that the slot opening 62 is a through opening in the clip body 18. In this regard, the wall surfaces 48a and 50a are formed at slot punching station 40 such that they are normal to clip surfaces 64 and 66, and extend substantially vertically from the clip outer surface 64 to the clip inner surface 66. The projections 58 and 60 preferably have a substantially matching configuration and are disposed opposite each other across slot opening 62. In other words, the projections 58 and 60 extend toward each other in the slot opening 62 to form a restrictive throat section 68 therebetween, as best seen in FIGS. 7 and 8. Referring to FIG. 12, when the cord 14 is fully seated in the slot 16 compressed between walls 48 and 50 thereof, peripheral compressed portions of the cord 14 will be disposed below bottoms 59 and 61 of the projections 58 and 60 so that the projections 58 and 60 resist shifting of the cord 14 in the slot 16 and, in particular, in a direction up and around projection bottoms 59 and 61 and past the projections 58 and 60 and out from the slot 16 away from clip body 18.

As described herein, the clip body 18 will be considered to have a width extending between sides 70 and 72 thereof and a length that is transverse to the width such that in the cut blank of an individual clip, see e.g., FIGS. 19 and 22, the length will be considered to run from distal ends 74 of leg projections 26 and 28 to distal end 76 of leg projection 32. Accordingly, it will be understood that when referring to the widthwise direction it will be generally in a direction across the clip body 18 and particularly the crown portion 20 thereof, and the lengthwise direction will be in a direction parallel to the sides 70 and 72 of the clip body 18, such as along the crown portion 20 thereof.

As previously described, the projections 58 and 60 extend into slot opening 62 and define throat 68 therebetween. The throat 68 is bounded by substantially flat and vertical surfaces 58a and 60a of the respective projections 58 and 60 that are parallel to corresponding vertical wall surfaces 48a and 50a. The distance across the wall surfaces 48a and 50a in the widthwise direction, $w_1$, is accordingly greater than the distance across the projection surfaces 58a and 60a in the widthwise direction, $w_2$, as shown in FIG. 12. Further, it can be seen from a comparison between FIGS. 11 and 12 that the outer diameter, d, of the cord outer surface 52 is sized so that it is larger than both $w_1$ and $w_2$ so that the cord 14 undergoes two different stages of compression as it is inserted into the slot 16. In this regard, the plastic material for the cord 14 has to be sufficiently deformable so that its diameter d can be compressed to one equal to $w_2$ for fitting through the throat 68 between the projection surfaces 58a and 60a. Further, the cord material should be selected so that it is readily sheared by the plunger knife edge 54 of the application tool 34. Generally, the smaller the diameter of the cord 14, the better the shearing or severing characteristics thereof. However, the cord 14 must have the resilience along with a sufficiently sized undeformed diameter, d, that provides it with a good, tight frictional fit in the slot 16. While a smaller width $w_1$ of the slot opening 62 can be formed so as to exert greater compression on a cord of a given diameter for proper frictional engagement therewith, it must be kept in mind that the punches 78 used to form the slots 16 cannot be so small as to negatively impact on their strength and durability. Thus, the cords 14 and slots 16 have their sizes coordinated to give the cords 14 proper severability characteristics while keeping a good friction fit in the slots 16 and providing an acceptable life for the punches 78.

By way of example, the distance across the slot opening 62 between vertical side wall surfaces 48a and 50a, $w_1$, is preferably approximately 0.050 inch, and the distance across the projection surfaces 58a and 60a, $w_2$, is preferably approximately 0.042 inch. Thus, the narrowed throat section 68 of the slot opening 62 is reduced by approximately 0.008 inch over the remainder of the slot opening 62 defined between the walls 48 and 50. Given these dimensions for the slots 16, the plastic cord 14 such as of polyethylene or polypropylene material has a diameter d that is preferably in a range of approximately 0.046 to 0.054 inch. It has been found that forming cord 14 from a polyethylene or polypropylene material within the above diameter range provides the cord 14 with an acceptable cost and has good severing characteristics, and the cord 14 will be able to be press fit through throat section 68 for being compressed in the slot 16 between side walls 48 and 50 thereof. A polyester nylon 6 plastic material that has minimal or no draw during manufacture thereof could also be utilized. Minimizing the drawing of nylon reduces its strength sufficiently so that it can be properly severed by the application tool 34. It has been found with these plastic materials that at the very small diameters herein, it is difficult to keep them circular in cross-section to within tolerances of ±0.005 inch along their length as particularly with low density materials, they tend to ovalize upon cooling after extrusion in the drawing process. Accordingly, minimizing or eliminating the drawing of the plastic cords 14 helps keep the shape of outer surface 52 at a generally circular cross-sectional configuration within the desired tolerances.

Another significant feature of the present invention is the formation of burrs 80 on the slot side walls 48 and 50 during the slot punching step at station 40. The following is a description of the relationship between dimensions of the punch 78 and slots 16; for the purposes of the following description the slot dimensions should be understood as substantially corresponding to dimensions of die openings 160 and 162 that will be described more fully hereinafter. The burrs 80 are formed as the punches 78 are driven through the blank metal strip 46 due to the larger clearance provided between slot forming portion 82 of each of the punches 78 and the side walls 48 and 50 versus the tight clearances between slot forming portion 82 and the projections 58 and 60. Normally, burrs such as those formed on slot walls 48 and 50 are to be avoided in the manufacture of metal pieces such as the clips 12 herein. However, applicants have found that the burrs 80 are advantageously provided in the clip slots 16 to enhance the holding power in keeping the cords 14 fixed in the slots 16.

More specifically, the punch slot forming portion 82 has respective inner and outer sides 84 and 86 that have a spacing only slightly smaller than the spacing $w_2$ across projection surfaces 58a and 60a, such as on the order of 0.003 inch, which is within proper stamping tolerances to avoid the formation of burrs on these surfaces 58a and 60a. On the other hand, the clearance between sides 84 and 86 of the punch slot forming portion 82 is approximately twice that of the above described clearance, i.e. 0.006 inch, which is normally beyond the desired stamping tolerance for forming the slot holes or openings 62. Thus, when the punches 78 are driven through the metal material 46, raised burrs 80 are formed in the slot 16 on the underside 64 of the blank metal strip 46. When the strip 46 is cut and formed into the U-shaped clip body 18 at station 44, the burrs 80 raised from the bottom of the wall surfaces 48a and 50a are oriented so that they generally extend in a fashion that opposes lengthwise shifting of the cord 14 in the slot 16.

In other words, the burrs 80 are formed because of the oversized clearance between the sides 84 and 86 of the punch slot forming portion and the corresponding side wall surfaces 48a and 50a such that as the punch 78 is driven through the metal strip 46, there is not a clean severing action and instead slugs 88 are separated from the bottom of the surfaces 48a and 50a in a manner that is more akin to a tearing action. This causes burrs 80 to be formed thereat which will project generally downwardly from the underside 64 of the strip 46 and in a direction toward the opposite surface 48a or 50a from the one on which they are formed. As the blank 46 having the slot openings 16 punched therein is cut into a section, the strip section is also folded about a mandril (not shown) into its U-shaped form with the slot walls 48 and 50 now having an upwardly or convexly curved orientation matching that of the crown portion of the clip body 18. Accordingly, there will be burrs 80 that, rather than extending downward from the slot walls 48 and 50, now tend to project at an angle relative to the vertical and inwardly toward the opposite wall 48 or 50.

Thus, when the cord 14 is press fit into the slot 16, the burrs 80 will grip the cord 14, and when a tensile force is exerted such as along the length of the cord 14, the burrs 80 will tend to dig and bite into the cord 14 to resist lengthwise shifting thereof. Applicants have found a significant advantage in intentionally providing burrs 80 on the slot walls 48 and 50 during the formation thereof so as to improve the holding power of the clip slots 16 on the cords 14 over that provided by the previously-described friction fit and the projections 58 and 60.

Figure 43:
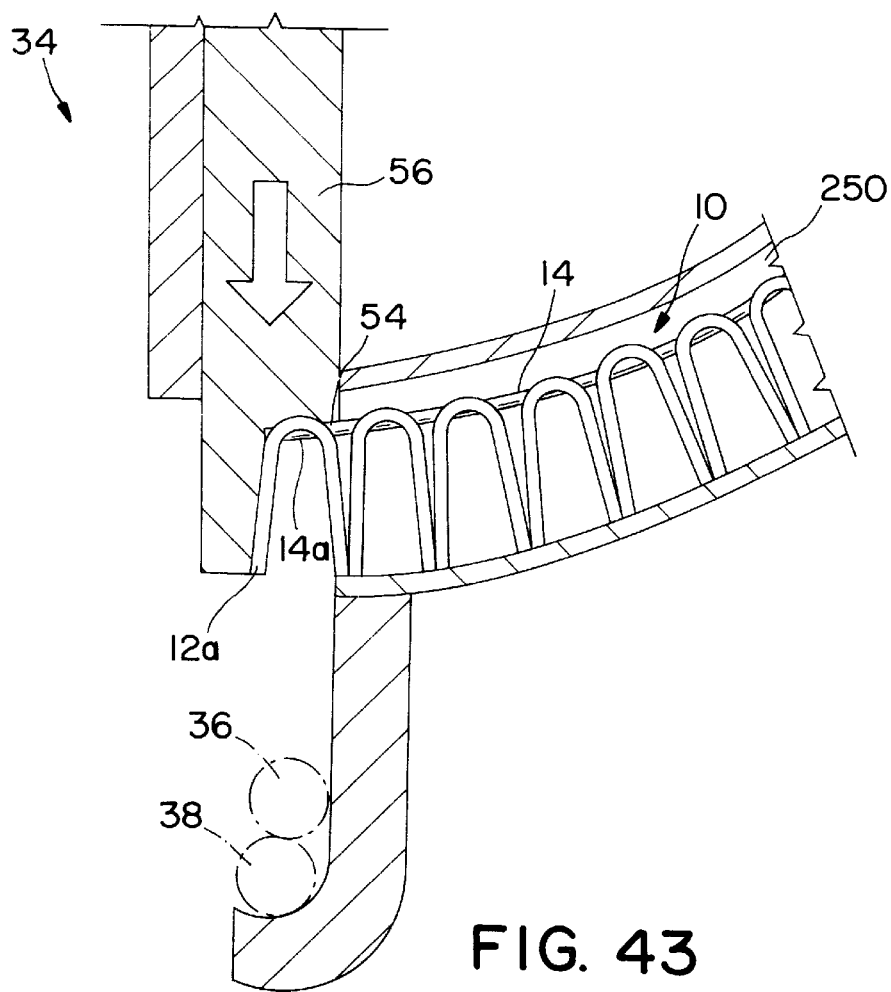
FIG. 43 is a sectional view of a hand held clip application tool showing a collated row of clips loaded therein with the lead clip in position for being severed from the assembly by a plunger blade of the application tool.

Accordingly, when the formed clip bodies 18 come from the station 44 to the cord insertion station 42, cords 14 are press fit into the slots 16 with the cords 14 first being compressed by the projections 58 and 60 from their undeformed diameter, d, down to a width equal to $w_2$ thereacross. Continued insertion force eventually causes the cord 14 to substantially pass the projections 58 and 60 so that its diameter across the slot opening 62 now expands to that equal to $w_1$ which is still less than its undeformed diameter, d, but greater than $w_2$. With the cord 14 fully inserted in the slot 16, it will be seated at curved or arcuate slot ends 90 and 92 interconnecting the slot walls 48 and 50 at either end thereof. The seated cord 14 will be gripped by the burrs 80 on the slot walls 48 and 50 between which the cord 14 is compressed, and also on the slot ends 90 and 92. The projections 58 and 60 are formed approximately midway between the slot ends 90 and 92 on their respective sidewalls 48 and 50. With the cord 14 seated at the slot ends 90 and 92 and compressed between side walls 48 and 50, the cord 14 extends generally linearly between the slot ends 90 and 92 such that a portion thereof extends below the underside 66 of the crown portion 20, as can be seen in FIG. 43. As previously discussed, with the small diameter plastic cords 14, it can be difficult to maintain an outer diameter that at all points along the cord length is larger than the distance $w_1$ across the slot side walls 48 and 50. In addition, providing the cord 14 with too large of a diameter so that even when at its minimum tolerance the diameter thereof is still larger than the distance $w_1$ across slot walls 48 and 50 can create problems in both the cord insertion process and when the cord is to be severed by the application tool 34.

Accordingly, several alternative constructions of plastic cords that are designed to satisfy the above mentioned needs are shown in FIGS. 13–18. In FIG. 13, a cord 94 is shown that is provided with areas 96 of reduced cross-sectional diameter formed during the extrusion of the cord 94. The reduced diameter areas 96 can be spaced along the cord 94 at predetermined locations such that these areas 96 fall between adjacent clips 12 in the collated assembly 10. In this manner, the application tool knife edge 54 will be able to cut through the cord 94 along the reduced diameter areas 96 thereof to provide easier separation of the cord 94 thereat. As an alternative, instead of extruding the cord 94 with these areas 96, the plastic cord can be mechanically notched or nicked before insertion into the clip slot 16.

FIGS. 14a and 14b show a cord 98 having an outer contoured surface 100 which has a maximum diameter that is greater than the distance $w_1$ across the slot walls 48 and 50. The contoured surface 100 has a helical depression or recess 102 formed therein and along the length of the cord 98 so that at diametrically opposing positions at all locations along the cord length there will be opposite notches 102a of the recess 102 disposed thereat, as best seen in FIG. 14b. Provision of the recessed surface 100 allows the diameter of the cord 98 to be slightly increased so as to provide for looser tolerances in meeting the cord insertion and severability characteristics necessary for the slotted clip collated assembly 10 herein. The larger diameter cord 98 also provides for an increase in the frictional forces exerted between the slot walls 48 and 50 and the cord surface 100.

FIGS. 15a and 15b show a variation on the cord 94 in that instead of providing a helical recess 102, cord 104 has a contoured outer surface 106 by way of raised helical projection 108 which extends along the length of the cord 104. As can be seen in FIG. 15b, the projection 108 provides the cord 104 with diametrically opposite raised projection portions 108a at all locations along the cord length. The maximum diameter of the cord 104 occurs as measured across the projection portions 108a which can be larger than the maximum outer diameter of a the cord 14 having a circular cross-section as not as much plastic cord material is at this diameter. In this manner, the projection portions 108a can be compressed past the slot projections 58 and 60 and will bear against the slot walls 48 and 50 with increased frictional resistance due to their larger diameter. In addition, the tolerances for the cord 104 are not as critical due to the larger outer diameter at the projection 108 thereof. FIG. 16 shows a twisted cord 109 having a helical twist to form helical reduced cross-sectional areas 109a along its outer surface providing many of the same or similar advantages as cords 98 and 104. A tubular construction for cord 14 can also be provided to obtain similar benefits provided by the cords of FIGS. 13–16 in terms of having a larger diameter while still maintaining the ability to be readily severed by the application tool 34.

FIGS. 17 and 18 show alternative contoured surfaces 110 and 112, respectively, that can be used for the cord to provide it with a larger maximum diameter over that possible with the regular circular cross-sectional cord 14. Both of these contoured surfaces 110 and 112 have longitudinal projections 110a and 112a, respectively, which can be press fit through the slot projections 58 and 60 for bearing against the slot side walls 48 and 50 to maintain a strong frictional fit therebetween while allowing for looser tolerances in forming the respective cords because of the larger maximum diameter. FIG. 17 shows a splined cord with the projections being elongate splines 110a whereas FIG. 18 shows a fluted cord with the projections being raised flutes 112a formed between concave longitudinal depressions 114.

Another way to improve the severability characteristics of the cords 14 is to provide special shapes to the slot ends for nicking or notching the cord 14 as an incident of inserting the cord 14 in the slot 16 and seating it at the ends thereof. Referring to FIGS. 19–24, two different constructions of slot ends 116 and 118, respectively, are illustrated. FIGS. 19–21 modify the normally rounded ends 90 and 92 and provide them with a V-shape. Accordingly, each of the slot ends 116 are provided with converging walls 120 and 122. As shown, wall 120 extends from either end of the slot wall 148, and wall 122 extends from either end of slot wall 150 with walls 120 and 122 at respective slot ends 116 meeting to form a sharp corner 124 at their juncture. Thus, when the cord 14 is pressed into the slot 16 at the cord insertion station 42, the cord 14 will be seated tightly at the V-shaped ends 116 with the sharp corner 124 being effective to notch the cord 14 thereat. This notching of the cord 14 creates an area of weakness therein which allows it to be more easily sheared and severed by the plunger blade 54 of the application tool 34.

Instead of modifying the curved ends 90 and 92 to provide the V-shaped thereto, FIGS. 22–24 show slot ends 118 that are provided with a thin edge 126 such as by swaging or coining thereof. In other words, the plastic material of the clip body 18 adjacent the ends 118 has pressure applied thereto along the outer and inner surfaces 64 and 66 thereof so that tapered surface portions 62a and 64a are formed extending into the slot openings 62. The tapered surface portions 62a and 64a meet at thin edge 126. Accordingly, coining the slot ends 118 provides a thinned material area 128 including thin edge 126 thereof at the slot ends 118 such that when the cord 14 is press fit and seated at the ends 118, the thin edge 126 will cut a notch in the cord 14 for providing an area of weakness therein assisting in the severing of the cord 14 by the application tool 34.

FIGS. 25 and 26 are directed to alternative cords 138 and 132, respectively, with each including a different cross-sectional configuration. As shown, the cords 130 and 132 each include respective upper and lower portions. The upper portion 134 of cord 130 has a lower foot portion 126 depending therefrom, and the upper portion 138 of cord 132 has lower foot portion 140 depending therefrom. The only difference between cords 130 and 132 lies in the configuration of their respective foot portions 136 and 140. Whereas the sides 136a and 136b of foot portion 136 are substantially straight and vertical except at the rounded curved bottom 136c thereof, the foot portion 140 has a substantially circular configuration except at its juncture with the upper portion 138 thereof. The configuration of the respective upper portions 134 and 138 are substantially identical and will lie on top of the clip crown portions 20 with the respective foot portions 136 and 140 press fit into the slots 16. The cord 132 by its foot projection 140 provides for greater frictional engagement with side walls 48 and 50 of the slots 16 due to the larger diameter of the foot portion 140 thereof versus the spacing between sides 136a and 136b of lower foot portion 136 of cord 130. The reason for this is due to the circular configuration of the foot portion 140 which provides it with clearance areas 142a and 142b into which the slot projections 158 and 60 can extend, as opposed with the straight wall surfaces 136a and 136b of foot projection 136, where the projections 58 and 60 will pinch into the projection 136. On the other hand, the reduced frictional engagement between the foot portion surfaces 136a and 136b and the slot walls 48 and 50 because of the narrower nature of the foot portion 136 over the circular foot portion 140 is compensated for by the aforementioned pinching action exerted by the projections 58 and 60 on the foot portion 136 to hold it securely in the clip slot 16.

Figure 27:
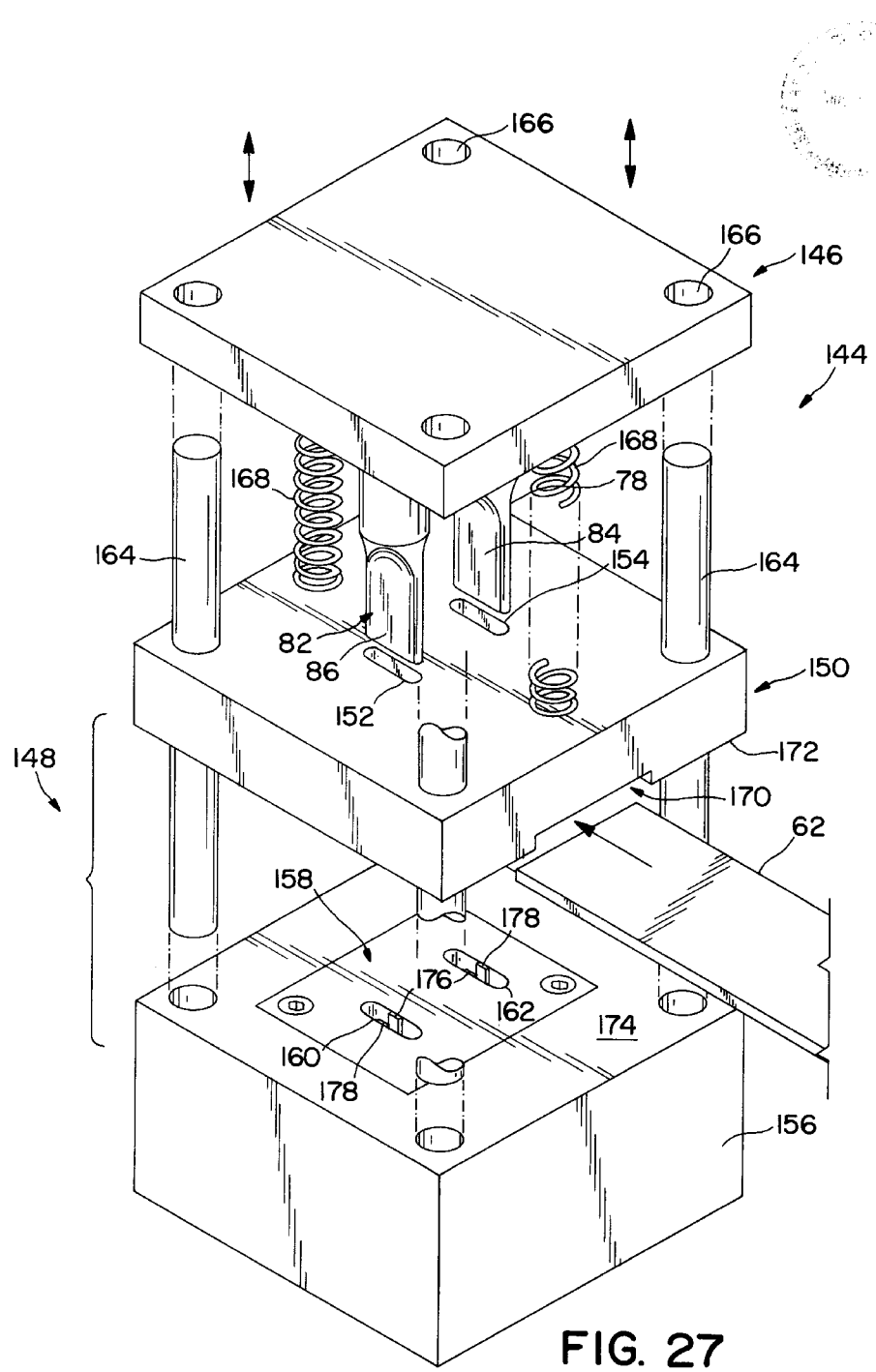
FIG. 27 is a perspective view of a die press including upper and lower portions thereof and showing punches for being driven into die openings for forming the slots in the blank metal strip.

Referring next to FIG. 27, a die press apparatus generally designated with reference numeral 144 is shown which can be used in the slot punching station 40. The die press apparatus 144 generally includes an upper punch plate portion 146 which carries the pair of punches 78, and a lower guide plate and die block portion 148. More particularly, the lower portion 148 includes upper guide plate 150 having a pair of parallel oval guide slots 152 and 154 extending therethrough in alignment with the punches 78, and a lower die block 156 in which die insert 158 is secured having a pair of parallel die cavity openings 160 and 162 formed therein. Cycling of the die upper and lower portions 146 and 148 toward and away from each other punches slots 16 in the blank strip 62 of metal material fed over the die openings 160 and 162.

Preferably, it is the upper punch plate portion 146 that moves toward and away from the fixed lower portion 148 during a slot forming cycle. The punch plate portion 146 travels up and down along guide pins 164 extending through corresponding apertures 166 formed in the plate 146. The guide pins 164 are rigidly fixed at each corner of the lower plate and block portion 148 with the through apertures 166 correspondingly formed in each corner of the upper plate portion 146. The plate portion 146 is biased to its open position with the punches 78 and more particularly the slot forming portion 82 thereof retracted out from the guide slots 152 and 154 and corresponding die cavities 160 and 162 by way of coil springs 168.

The guide plate 150 has an elongate recess 170 formed on its underside 172 that extends lengthwise in a direction toward and past the parallel guide slots 152 and 144 and having a width sufficient to receive the width of the blank metal strip 62. Thus, with the guide plate 150 assembled to the die block 156, the underside 172 of the guide plate 150 will be in abutment with the upper surface 174 of the die block with the recess 170 cooperating with the surface 174 to provide a through passageway for the blank strip 62 to be fed into position over the die openings 160 and 162 for having slots 16 punched therein by punches 78 as the punch plate 146 is driven downward against the bias of springs 168. After the section of the metal strip 62 has a pair of slots 16 punched therein, it is fed out from the downstream end of the recess 170 to the blank cutting and clip formation station 44 for further processing with the succeeding section of the blank strip 62 being brought into position over the die openings 160 and 162.

One problem that occurs when punching very small slugs 88 from fairly light sheet metal stock material such as blank strip 62 is that the lubricating fluids tend to create enough surface tension so that the slugs 88 can be pulled back up with the punches 78 as they are retracted out from the die openings 160 and 162 which can cause problems with subsequent cycling of the die press 144 for forming slots 16 into successive sections of the strip 62. To handle this slug pullback problem, the die openings 160 and 162 have projections 176 and 178 that extend into the die openings 160 and 162 from opposite respective sides 180 and 182 thereof. To complete the generally oval shape of the die cavity openings 160 and 162 less the projections 176 and 178 extending therein, the straight substantially parallel guide cavity sides 180 and 182 are interconnected by arcuate or rounded ends 184 and 186 at either end of the die openings 160 and 162.

As previously explained, the dimensions of the die cavity openings 160 and 162 are substantially the same as the previously described dimensions for the clip slots 16. Referring to FIGS. 31–34, the construction of punches 78 is illustrated and shows an enlarged head 188 having a generally circular configuration with a flat 188a on one side thereof for being attached in an opening (not shown) on the underside of the punch plate 146. Below the head 188, an enlarged body portion 190 of the punch 78 is provided having arcuate tapering and converging surfaces 190a and 190b at the bottom and on either side thereof. The converging surfaces 190a and 190b are interconnected at their distal ends by flat bottom surface 190c to which the punch slot forming portion 82 is attached. The slot forming 82 has a generally oval configuration in cross-section for fitting into the die cavity openings 160 and 162 and between the projections 176 and 178 extending therein, as best seen in FIG. 34. Accordingly, the sides 84 and 86 of the slot forming portion 82 are interconnected with rounded ends 192 and 194. The construction and size of the above-described punches 78 has been found to provide the punches 78 with sufficient robustness for high-volume production of the clip assemblies 10 herein.

When the die apparatus upper portion 146 is driven toward the lower portion 148, the punch slot forming portion 82 punches out slugs 88 from the section of the blank metal strip 62 positioned over the die cavities 160 and 162 to form slots 16 therein having a substantially matching configuration to these cavities. As the slot forming portion 82 of each of the punches 78 enters into the die cavities 160 and 162, the clearance provided between the punch slot forming portion sides 84 and 86 and the die cavity projections 176 and 178 is substantially the same as that previously described with respect to the clip slots 16, i.e. on the order of approximately 0.003 inch, while the clearance between the sides 84 and 86 and the die cavity sides 180 and 182 is oversized, i.e. on the order of 0.006 inches. In this manner, punching of the slots 16 in the blank strip 62 will create burrs on the slot side walls 48 and 50 due to the oversized clearance between the punch slot forming portions sides 84 and 86 and the die cavity sides 180 and 182.

The very tight dimensions between the punch portion 82 and projections 176 and 178 make it very difficult for slugs 88 to be pulled out from the cavities 160 and 162 with the punches 78. Any such pull back of the slugs 88 requires that they be properly aligned between the cavity projections 176 and 178, which is very unlikely given the larger clearances, and thus room for slug shifting between the punch portion 82 and cavity sides 180 and 182. As is apparent, the formation of projections 58 and 60 in the clip slots 16 facilitates improved holding of the cord 14 therein as well as providing manufacturing benefits in limiting the pullback of slugs 88 back through the cavities 160 and 162.

Figure 29:
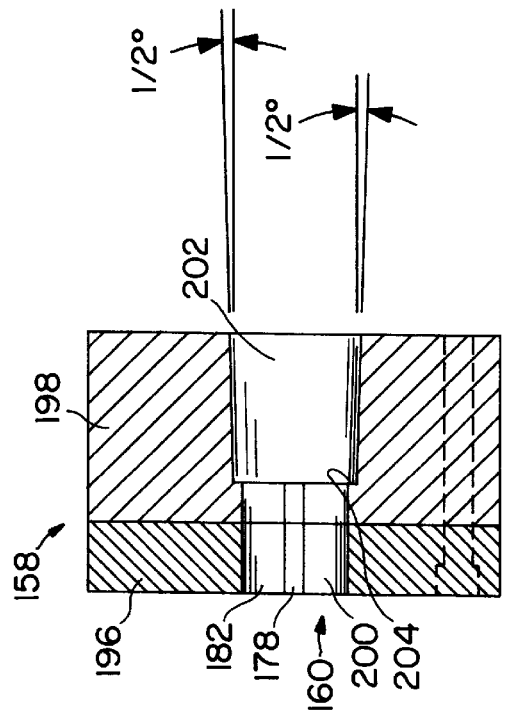
FIG. 29 is a sectional view taken along line 29-29 of FIG. 28 through one of the die openings and showing the opening stepping to a larger sized opening in the insert and having a taper thereto.
Figure 28:
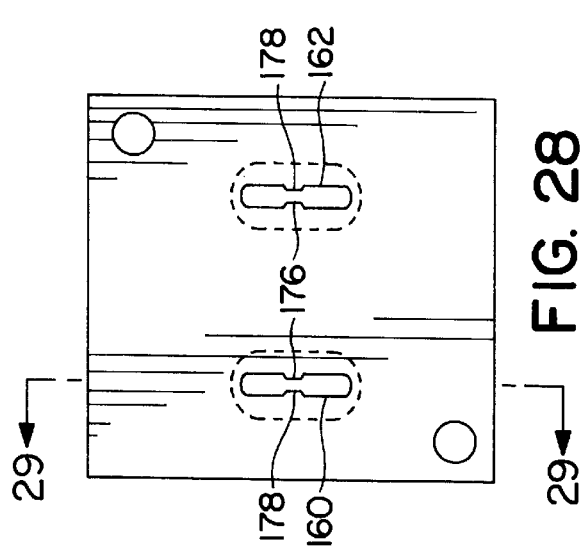
FIG. 28 a plan view of a die insert including die openings with projections extending into the opening from either side thereof.
Figure 30:
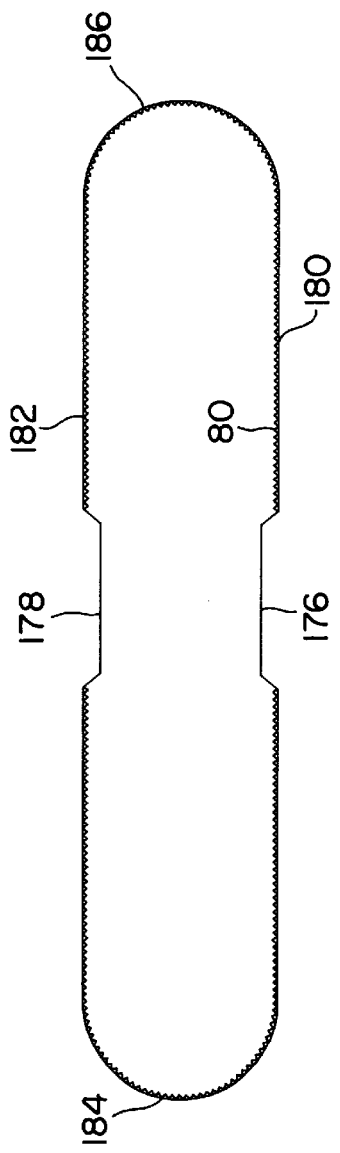
FIG. 30 is an enlarged view of the shape of one of the openings of the die.

Referring to FIG. 29, the die insert 158 can include an upper carbide plate portion 196 attached to a lower metal mounting block portion 198. The cavities 160 and 162 can be machined such as by electric-discharge machining (EDM) in an identical fashion to each other with FIG. 29 showing the construction of die cavity 160. As shown, the die cavity 160 preferably has an upper portion 200 that steps open to a larger lower portion 202 in the mounting block 198 and opens at the bottom thereof to provide a clearance hole for slugs 88 punched from the blank strip 62. By having the larger size cavity opening portion 202, it is less likely that the slugs 88 punched from the strip 62 will be brought back up from this larger opening portion 202 and into the smaller opening upper portion 200 of the cavity 160. Also, as previously discussed, the projections 176 and 178 also will limit any pullback of the slugs through the cavity upper portion 200. Thus, for the punches 78 to pull the slugs 88 back up therewith and out from the die insert 158 as the punch plate 146 is moved away from the die portion 148, the slugs 88 will have to clear the shoulder 204 formed between the larger opening portion 202 and the smaller opening portion 200 of the cavity 160 and will also, to fit into the cavity upper portion 200, have to be in lateral alignment between the projections 176 and 178. To further assist in creating a path of least resistance out from the bottom of the die insert 158, a slight draft or taper such as on the order of a half a degree, can be EDM'd in the cavities 160 and 162 from approximately the midway point of the cavity upper portion 200 and through the cavity lower portion 202 to the bottom of the mounting block 198.

After the slot punching station 40, sections of the punched blank strip 64 are successively fed to the blank cutting and clip forming station 44 where the slotted U-shaped clip bodies 18 are formed which are then fed to the cord insertion station 42. One form of such a station 42 is depicted in FIG. 1 where a pair of cords 14 are shown on spools 206. The cords 14 are unwound off from the spools 206 and are directed over a nose guide 208 having arcuate parallel guide slots 210 formed therein which redirect the cords 14 back under a cord pressing mechanism 212 and under which the individual clip bodies 18 are run with their respective slots 16 in linear alignment with each other.

The cord pressing mechanism 212 includes a lower wedge block 214, as best seen in FIGS. 38–41. The wedge block has an upper inclined surface 216 that tapers downwardly from upstream to downstream in the clip travel direction 218 and a bottom substantially flat horizontal surface 220 on which a pair of parallel elongate cord insertion ridges 222 are formed. The ridges 222 similar to the block upper surface 216 are slightly tapered downwardly from upstream to downstream, such as with a 2° taper to the horizontal. The ridges 222 are laterally spaced a distance equal to that of the parallel slots 16 formed in the clip bodies 18 so that they are aligned thereover. Cords 14 fed over the clip body slots 16 are pushed and inserted into the slots 16 by the tapered ridges 222 as they travel under the block 214.

More specifically, the cord pressing mechanism 212 reciprocates in a vertical up and down manner in synchronization with the die press apparatus upper plate 146 so that as a pair of slots 16 are punched out from a section of the metal strip 62 that is to be formed into an individual clip body 18 at station 44, the cord pressing mechanism 212 will go through a corresponding up and down stroke. As the wedge block 214, and specifically the tapered ridges 222 thereof, are longer than the length of the formed U-shaped clip bodies 18 such as by approximately three to seven times, each clip body 18 will be subjected to a corresponding number of strokes of the cord pressing mechanism 212. And because of the progressively increasing downstream taper of the ridges 222, the cords 14 will be progressively pushed downwardly and seated further into the slots 16 as they move downstream under the wedge block 214. By progressively seating the cords 14 in the slots 16, the chance for cord breakage during the cord insertion stage is reduced.

For mounting the lower wedge 214 in proper position relative to the clip bodies 18 traveling thereunder, an upper adjustment wedge block 224 is provided having a lower inclined bottom surface 224a that has a substantially matching taper to that of the upper surface 216 of wedge block 214. The upper surface of adjustment block 224 is fixed to impact plate 226, and the wedge block 214 is slidable relative to the block 224 and plate 226 so that its position in the clip travel direction 218 can be adjusted or fine tuned to provide for the desired cord pressing action for proper seating of the cords 14 in the clip slots 16.

Figure 35:
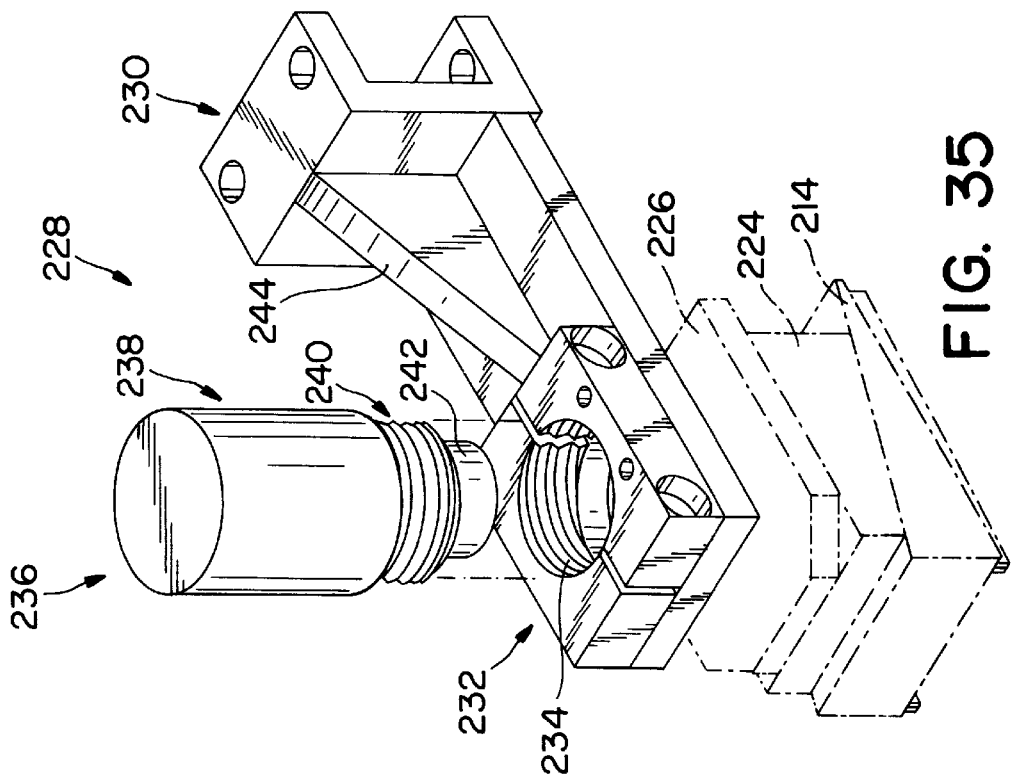
FIG. 35 is a perspective view of an extension arm for being operatively connected to the die press upper portion and having an air spring for controlling operation of the, cord insertion station.
Figure 36:
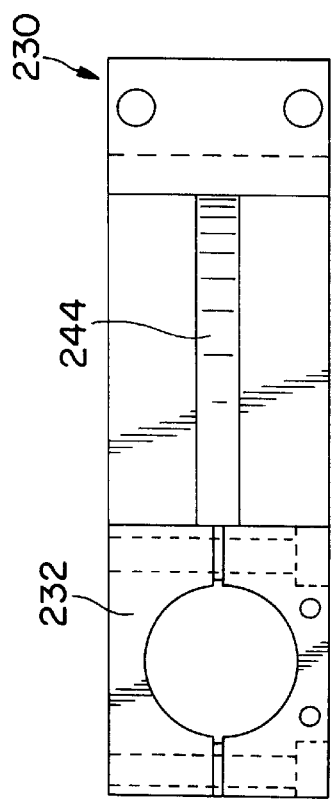
FIG. 36 is a plan view of the extension arm of FIG. 35 showing an opening in the arm for mounting the air spring therein.
Figure 37:
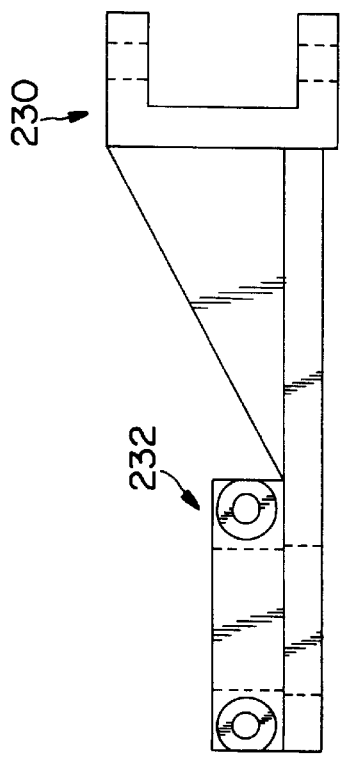
FIG. 37 is an elevation view of the extension arm and showing a bracket portion for mounting to the die upper portion and a gusset portion to provide strength to the arm.

To cause the reciprocating vertical up and down action of the cord pressing mechanism 212, an extension arm assembly 228 is provided, as shown in FIGS. 35–37. The extension arm assembly 228 includes a bracket portion 230 at one end that is operatively connected to the punch plate 146 of die apparatus 144 so that the extension arm assembly 228 moves up and down therewith. At the other end of the arm 228, an air cylinder mounting portion 232 is provided including an internally threaded opening 234. An air cylinder 236 having an outer cylinder housing 238 with an externally threaded lower portion 240 is threaded into the opening 234 and securely clamped into place therein as by bolting. A piston plunger 242 is biased exteriorly of the cylinder housing 238 from the bottom thereof for engaging the impact plate 226 of the cord pressing mechanism 212 as the extension arm assembly 228 is caused to travel vertically downward when the die apparatus punch plate 146 is driven downward for forming slots 16 in the strip 62. To provide the extension arm assembly 228 with strength, a gusset portion 244 can be formed extending from bracket portion 230 to air cylinder mounting portion 232. In this manner, the extension arm assembly 228 is provided with sufficient strength to withstand repeated impact against impact plate 226 for high volume production of slotted clip assemblies 10.

After the cords 14 are fully inserted into the slots 16 as they move downstream past the cord pressing mechanism 212, the collated clips 12 can be either formed into coiled assemblies for storage and transportation or cut into assemblies with a predetermined number of clips 12 by a cutting mechanism 244, such as shown in FIG. 1. The cutting mechanism 244 can include a roller wheel 246 having a spring loaded cutting blade 248 inserted in a peripheral recess thereof. The cutting blade 248 is effective to cut the cords 14 with every rotation of the wheel 246 with the roller rotation and clip travel speed in the downstream direction 218 being coordinated so that the desired predetermined number of clips 12 are in each assembly.

Figure 42:
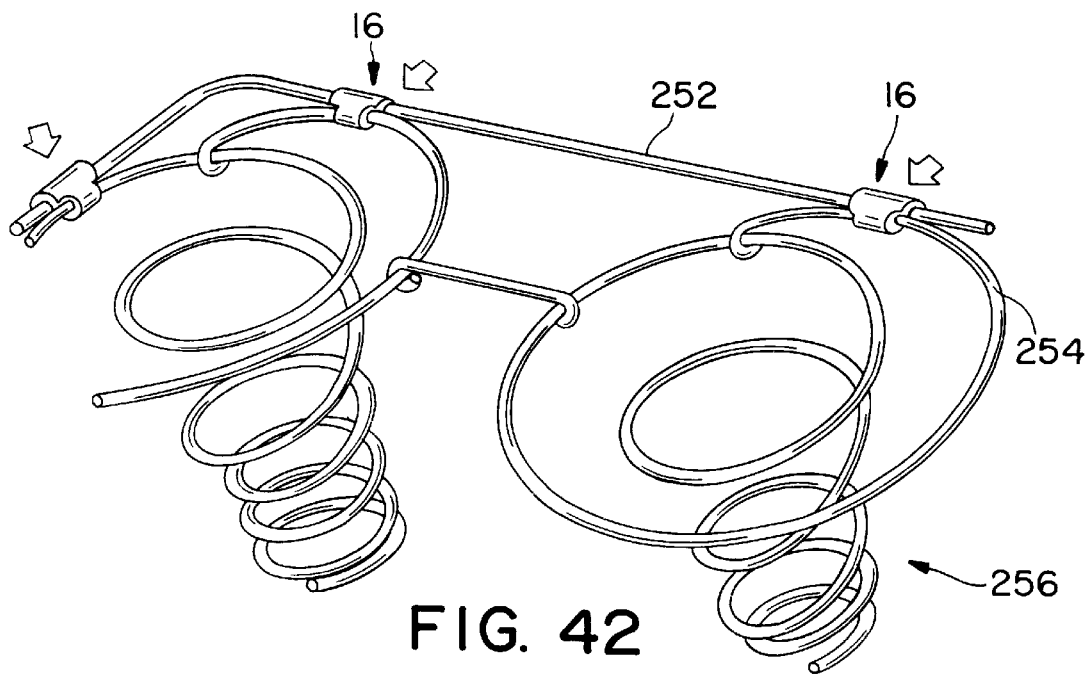
FIG. 42 is a perspective view of the clips herein clinched about by a border wire and coil springs of a mattress.

As previously discussed, the collated clip assemblies 10 can be loaded in a magazine 250 of an application tool 44 with a leading clip 12a of the collated assembly 10 exposed out from the magazine 250 to be driven by tool plunger 56 for clinching about wire sections 36 and 38 such as of a border wire 252 and an upper coil wire 254 of mattress coil spring 256 (FIG. 42) that are positioned for clinching in a hook jaw member 251 of the tool. As the clips 12 herein are primarily for use in the mattress and bedding industry, it is important that the plastic cords 14 utilized in the slots 16 of individual clip bodies 18 do not negatively affect the performance of the product in which they are used. In particular, with coil springs 256 that are tempered in a heat treat oven such as at temperatures of between approximately 450° F. and 500° F. with dwell times of anywhere from 15 to 30 minutes, it is important that the plastic material of the cords 14 have appropriate melt characteristics, and specifically in terms of the ability to flow. It has been found with certain plastic materials that when the small pieces of cord sections cut in the clip slots 16 are subjected to temperatures such as found in heat treat ovens, they tend to bead or ball up leaving a raised bump on the clip outer surface 64. Discontinuities along the clip outer surface 64, and in particular those created by raised bumps are especially undesirable in the bedding industry as when the mattress material is placed thereover, the discontinuities or raised bumps may be felt by the user.

Accordingly, it is important that the plastic of the cords 14 do not cause the aforementioned beading problem when heated in heat treat ovens. It is particularly desirable that the cord material flows so that it spreads out in the clip slots 16 and moves to the interface between the border and coil spring wires 252 and 254 held by the clips 16 and the clip inner surface 66 so that upon cooling and solidification, the plastic material can enhance the holding power of the clip 16 on the clinched together wires 252 and 254. In this regard, polymers which are normally flowable at temperatures over approximately 450° F. are particularly desirable for use in forming the cords 14. Once such cord material that is particularly preferred is a polybutylene terephthalate (PBT) material. It has been found that when subjected to the levels of heat and dwell times as found in heat treat ovens, PBT melts and flows especially well, such as to the interface between the clips 16 and clinched wires 252 and 254, and does not cause any bead up problems, as previously described. Alternatively, nylon can be used for the cord 14 and run through heat treat ovens without causing a bead to form over the outer surface 64 of the clip body crown portion 20.

While there have been illustrated and described particular embodiments of the present invention, it will be appreciated that numerous changes and modifications will occur to those skilled in the art, and it is intended in the appended claims to cover all those changes and modifications which fall within the true spirit and scope of the present invention.

What is claimed is:

1. A clip for attachment to another identical clip by a resilient cord and for being applied to mattress wires to hold the wires together, the clip comprising:

a body of the clip formed of a metallic material and having an arcuate crown portion and depending leg portions, the clip body having a width across the crown and a length transverse to the width;

at least one slot that extends lengthwise in the clip body and through the crown portion thereof to define a slot opening for receiving a resilient cord;

side surfaces of the slot extending vertically through the clip body in parallel orientation to each other and having a first predetermined spacing in the widthwise direction therebetween with the predetermined spacing selected to create an interference friction fit with a resilient cord that is press fit in the slot;

opposite ends of the slot interconnecting the parallel slot side surfaces;

a pair of opposing projections at predetermined positions along respective slot side surfaces intermediate the ends thereof and which extend into the slot opening toward each other, and substantially parallel surfaces on the opposing projections in the slot opening spaced at a second predetermined distance less than the first predetermined distance with the first and second predetermined distances sized for press fitting of a resilient cord in the slot and against shifting out from the slot.

2. The clip of claim 1 wherein the slot side surfaces include burrs for gripping a resilient cord to resist shifting of a cord in the slot in the lengthwise direction.

3. The clip of claim 1 wherein the at least one slot comprises a pair of identical parallel slots for correspondingly receiving a pair of resilient cords press fit therein.

4. The clip of claim 1 wherein the slot opposite ends have an arcuate shape to provide a seat for a cord in the slot.

5. The clip of claim 1 wherein the slot includes opposite ends interconnecting the slot side surfaces with the ends each having a V-shape for creating an area of weakness in a cord press fit in the slot and seated at the V-shaped ends thereof.

6. The clip of claim 1 wherein the slot includes opposite ends interconnecting the slot side surfaces with the ends each including a thin edge for creating an area of weakness in a cord press fit in the slot and seated at the thin edge of the ends thereof.

* * * * *

UNITED STATES PATENT AND TRADEMARK OFFICE
CERTIFICATE OF CORRECTION

PATENT NO.   : 6,044,530
DATED        : April 4, 2000
INVENTOR(S)  : Room et al.

It is certified that error appears in the above-identified patent and that said Letters Patent is hereby corrected as shown below:

Column 2,
Line 9, after the word "possible" insert -- and --.

Column 6,
Line 65, after ";" insert -- and --.

Column 8,
Line 9, change "52a" to -- 52 --.

Column 9,
Line 57, delete the sentence "Accordingly, minimizing or eliminating the drawing of the plastic cords 14 helps keep the shape of outer surface 52 at a generally circular cross-sectional configuration within the desired tolerances. --

Column 10,
Line 34, after "50a" insert -- are --.

Column 12,
Line 49, delete "plastic".
Line 61, change "138" to -- 130 --.
Line 65, change "126" to -- 136 --.
Line 58, change "144" to -- 154 --.

Column 14,
Line 21, change "guide" to -- die --.
Line 37, after the word "forming" second occurrence insert -- postion --.

UNITED STATES PATENT AND TRADEMARK OFFICE
CERTIFICATE OF CORRECTION

PATENT NO. : 6,044,530
DATED : April 4, 2000
INVENTOR(S) : Room et al.

It is certified that error appears in the above-identified patent and that said Letters Patent is hereby corrected as shown below:

<u>Column 15,</u>
Line 19, after "62" insert -- with shoulder 204 formed between the upper and lower portions 200 and 200 --.

Signed and Sealed this

Fourth Day of September, 2001

*Attest:*

*Nicholas P. Godici*

*Attesting Officer*

NICHOLAS P. GODICI
*Acting Director of the United States Patent and Trademark Office*

UNITED STATES PATENT AND TRADEMARK OFFICE
CERTIFICATE OF CORRECTION

PATENT NO. : 6,044,530
DATED : April 4, 2000
INVENTOR(S) : Room et al.

It is certified that error appears in the above-identified patent and that said Letters Patent is hereby corrected as shown below:

Column 15,
Line 19, delete the sentence "By having the larger size cavity opening portion 202, it is less likely that the slugs 88 punched from the strip 62 will be brought back up from this larger opening portion 202 and into the smaller opening upper portion 200 of the cavity 160."
Line 26, delete the sentence "Thus, for the punches 78 to pull the slugs 88 back up therewith and out from the die insert 158 as the punch plate 146 is moved away from the die portion 148, the slugs 88 will have to clear the shoulder 204 formed between the larger opening portion 202 and the smaller opening 200 of thecavity 160 and will also, to fit into the cavity upper portion 200, have to be in lateral alignment between the the projections 176 and 178."

Column 16,
Line 24, after "224" delete "and plate 226".
Line 50, change "impact" to -- impacts --.
Line 66, change "44" to -- 34 --.

Column 17,
Line 24, after "user" insert -- particularly where the bumps are relatively large and/or sharp --.

This certificate supersedes Certificate of Correction issued September 4, 2001.

Signed and Sealed this

Fifteenth Day of October, 2002

*Attest:*

JAMES E. ROGAN
*Director of the United States Patent and Trademark Office*

*Attesting Officer*

UNITED STATES PATENT AND TRADEMARK OFFICE
CERTIFICATE OF CORRECTION

PATENT NO.    : 6,044,530
DATED         : April 4, 2000
INVENTOR(S)   : Room et al.

It is certified that error appears in the above-identified patent and that said Letters Patent is hereby corrected as shown below:

Column 2,
Line 9, after the word "possible" insert -- and --.

Column 6,
Line 65, after ";" insert -- and --.

Column 8,
Line 9, change "52a" to -- 52 --.

Column 9,
Line 57, delete the sentence "Accordingly, minimizing or eliminating the drawing of the plastic cords 14 helps keep the shape of outer surface 52 at a generally circular cross-sectional configuration within the desired tolerances. --

Column 10,
Line 34, after "50a" insert -- are --.

Column 12,
Line 49, delete "plastic".
Line 61, change "138" to -- 130 --.
Line 65, change "126" to -- 136 --.
Line 58, change "144" to -- 154 --.

Column 14,
Line 21, change "guide" to -- die --.
Line 37, after the word "forming" second occurrence insert -- postion --.

UNITED STATES PATENT AND TRADEMARK OFFICE
CERTIFICATE OF CORRECTION

PATENT NO. : 6,044,530
DATED : April 4, 2000
INVENTOR(S) : Room et al.

It is certified that error appears in the above-identified patent and that said Letters Patent is hereby corrected as shown below:

Column 15,
Line 19, delete the sentence "By having the larger size cavity opening portion 202, it is less likely that the slugs 88 punched from the strip 62 will be brought back up from this larger opening portion 202 and into the smaller opening upper portion 200 of the cavity 160."
Line 19, after "62" insert -- with shoulder 204 formed between the upper and lower portions 200 and 200 --.
Line 26, delete the sentence "Thus, for the punches 78 to pull the slugs 88 back up therewith and out from the die insert 158 as the punch plate 146 is moved away from the die portion 148, the slugs 88 will have to clear the shoulder 204 formed between the larger opening portion 202 and the smaller opening 200 of thecavity 160 and will also, to fit into the cavity upper portion 200, have to be in lateral alignment between the the projections 176 and 178."

Column 16,
Line 24, after "224" delete "and plate 226".
Line 50, change "impact" to -- impacts --.
Line 66, change "44" to -- 34 --.

Column 17,
Line 24, after "user" insert -- particularly where the bumps are relatively large and/or sharp --.

This certificate supersedes Certificate of Correction issued September 4, 2001 and October 15, 2002.

Signed and Sealed this

Thirty-first Day of December, 2002

JAMES E. ROGAN
*Director of the United States Patent and Trademark Office*